(12) United States Patent
Walecki

(10) Patent No.: US 11,073,372 B2
(45) Date of Patent: *Jul. 27, 2021

(54) MULTI-PROBE GAUGE FOR SLAB CHARACTERIZATION

(71) Applicant: APPLEJACK 199 L.P., Milpitas, CA (US)

(72) Inventor: Wojciech J Walecki, Sunrise, FL (US)

(73) Assignee: APPLEJACK 199 L.P., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/741,610

(22) Filed: Jan. 13, 2020

(65) Prior Publication Data

US 2020/0149866 A1    May 14, 2020

Related U.S. Application Data

(63) Continuation-in-part of application No. 16/277,582, filed on Feb. 15, 2019, now Pat. No. 10,551,163, which is a continuation of application No. 15/914,445, filed on Mar. 7, 2018, now Pat. No. 10,209,058.

(51) Int. Cl.
    *G01B 9/02*      (2006.01)
    *G01B 11/30*     (2006.01)
    *G01B 11/06*     (2006.01)

(52) U.S. Cl.
    CPC ..... *G01B 9/02091* (2013.01); *G01B 9/02021* (2013.01); *G01B 9/02027* (2013.01); *G01B 9/02044* (2013.01); *G01B 11/06* (2013.01); *G01B 11/303* (2013.01)

(58) Field of Classification Search
    CPC ........... G01B 9/02017; G01B 9/02019; G01B 9/02021; G01B 9/02027; G01B 9/02028; G01B 9/02044
    See application file for complete search history.

(56) References Cited

U.S. PATENT DOCUMENTS

| | | | |
|---|---|---|---|
| 5,357,340 A | 10/1994 | Zochbauer | |
| 5,946,095 A | 8/1999 | Henningsen et al. | |
| 7,084,985 B2 | 8/2006 | Xie et al. | |
| 7,324,210 B2 * | 1/2008 | De Groot | G01B 11/0675 356/497 |

(Continued)

*Primary Examiner* — Jonathan M Hansen
(74) *Attorney, Agent, or Firm* — Maschoff Brennan

(57) ABSTRACT

The present subject matter at least provides an apparatus for characterization of a slab of a material. The apparatus comprises two or more frequency-domain optical-coherence tomography (FD-OCT) probes configured for irradiating the slab of material, and detecting radiation reflected from the slab of material or transmitted there-through. Further, a centralized actuation-mechanism is connected to the OCT probes for simultaneously actuating elements in each of the OCT probes to cause a synchronized detection of the radiation from the slab of material. A spectral-analysis module is provided for analyzing at least an interference pattern with respect to each of the OCT probes to thereby determine at least one of thickness and topography of the slab of the material. Further, in some embodiments, the slab of material may include a passivation layer. The apparatus may be configured to determine a thickness of the passivation layer.

12 Claims, 26 Drawing Sheets

(56) References Cited

U.S. PATENT DOCUMENTS

| | | | |
|---|---|---|---|
| 10,209,058 B1 | 2/2019 | Walecki | |
| 10,551,163 B2 * | 2/2020 | Walecki | ............ G01B 9/02021 |
| 2006/0077394 A1 | 4/2006 | Suzuki et al. | |
| 2006/0176490 A1 | 8/2006 | Suzuki et al. | |
| 2011/0279822 A1 | 11/2011 | Kannaka et al. | |
| 2017/0167919 A1 | 6/2017 | Learmonth et al. | |

* cited by examiner

MULTI-PROBE GAUGE FOR SLAB CHARACTERIZATION

CROSS REFERENCE TO RELATED APPLICATION

This application is related to U.S. patent application Ser. No. 15/410,328 filed on Jan. 19, 2017, and incorporated herein by reference in its entirety. This application is a continuation-in-part with respect to U.S. application Ser. No. 16/277,582, filed on Feb. 15, 2019, which is a continuation application of U.S. application Ser. No. 15/914,445 filed on Mar. 7, 2018, both of which are incorporated by reference in their entireties.

TECHNICAL FIELD

The embodiments discussed in this disclosure are related to a multi-probe gauge for slab characterization.

BACKGROUND

Frequency domain based optical coherence tomography (FD-OCT) probes have been used for characterization of properties of slabs of materials such as slab-thickness, slab structure and topography of the slabs. For ultra-thin slabs, industrially used measurement metrology is based on low-coherence interferometry. Such techniques are based upon an analysis of reflected infrared photon flux arriving from slab surfaces (layer-interfaces). The slab-thickness and characterization of the slab layer structure is obtained by analysis of an interferogram resulting from the FD-OCT probes.

A parameter that is often considered during metrology is a throughput measured in 'number of slabs' a tool can measure in a unit of time (usually expressed in slabs per hour). However, the throughput of the tool-measuring slabs is limited in the case of FD-OCT probes at-least due to limitations within the existing slab-handling and data-acquisition techniques. More specifically, data-acquisition speed is limited by the speed at which spectra can be acquired, which is in turn limited at least owing to independent operation of the plurality of probes positioned around the slab of material. In addition, conventional-mechanisms based on FU-OCT probes fail to take into account influence of vibration of the slab of material during the process of slab-characterization.

The subject matter claimed in this disclosure is not limited to embodiments that solve any disadvantages or that operate only in environments such as those described above. Rather, this background is only provided to illustrate one example technology area where some embodiments described in this disclosure may be practiced.

SUMMARY

This summary is provided to introduce a selection of concepts in a simplified format that are further described in the detailed description of the present disclosure. This summary is neither intended to identify key or essential inventive concepts of the disclosure, nor is it intended for determining the scope of the invention or disclosure.

In one embodiment, the present subject matter provides an apparatus for characterization of a slab of material. The apparatus comprises a plurality of frequency-domain optical-coherence tomography (OCT) probes configured to irradiate the slab of material at at-least one location, and detect radiation reflected from the slab of material or transmitted there-through. Further, a centralized actuation-mechanism is connected to the said plurality of OCT probes for actuating one or more elements in each of the OCT probes at a same time during irradiation of the slab of material to cause a synchronized-detection of the radiation from the slab of material by the plurality of OCT probes. A spectral-analysis module is configured to analyze an interference pattern of the radiation detected by each of the OCT probes to thereby determine at least one of thickness and topography of the slab of material.

In another embodiment, the present subject matter describes a process for characterization of a slab of material. The process comprises the positioning the slab of material on a chuck. The slab of material is irradiated at at-least one location by a plurality of frequency-domain optical-coherence tomography (OCT) probes. One or more elements within the plurality of OCT probes are actuated at a same time during the irradiation of the slab of material by the plurality of OCT probes to cause a synchronized detection of radiation reflected from the slab of material or transmitted there-through. Further, at least an interference pattern of the radiation detected by each of said OCT probe is spectrally-analyzed for determining thickness with respect to one or more locations at the slab of material, and topography of the slab of material.

In another embodiment, the present subject matter provide an apparatus for characterization of a slab of material. The apparatus may include two or more frequency-domain optical-coherence tomography (OCT) probes. The OCT probes may be configured to irradiate the slab of material at at-least one location and detect radiation reflected from the slab of material or transmitted there-through. The apparatus may further include a centralized actuation mechanism connected to the two or more OCT probes. The centralized actuation mechanism may be configured to actuate one or more elements in each of the OCT probes at a same time during irradiation of the slab of material to cause a synchronized detection of the radiation from the slab of material by the two or more OCT probes. The apparatus may further include a spectral-analysis module configured to analyze an interference pattern of the radiation detected by each of the OCT probes.

In some embodiments, the spectral-analysis module may be configured to analyze the interference pattern of the radiation to determine a thickness of the slab of material. The slab of material may include two or more layers. For example, the slab of material includes a first layer of a first material, for example a metal, and a passivation layer on the first material. In some embodiments, the spectral-analysis module may be configured to analyze the interference pattern of the radiation to determine a thickness of each of the two or more layers. For example, the spectral-analysis module may be configured to analyze the interference pattern of the radiation to determine a thickness of the first material and a thickness of the passivation layer.

In some embodiments, the spectral-analysis module may be configured to analyze the interference pattern of the radiation to determine a topography of the slab of material. The slab of material may include two or more layers. For example, the slab of material includes a first layer of a first material, for example a metal, and a passivation layer on the first material. In some embodiments, the spectral-analysis module may be configured to analyze the interference pattern of the radiation to determine a topography of a first surface of the first material. Additionally or alternatively, the spectral-analysis module may be configured to analyze the interference pattern of the radiation to determine a topography of a first surface of the passivation layer.

In another embodiment, the present subject matter describes a process for determining a topography of a slab of material. The process may include positioning a substantially-flat reference surface on a chuck. The process may also include actuating one or more elements within two or more frequency-domain optical-coherence tomography (OCT) probes at the same time to cause an operation through the two or more OCT probes. The operation may include irradiating the substantially-flat reference surface at at-least one location by the two or more OCT probes and synchronously detecting, by the two or more OCT probes, radiation reflected from the substantially-flat reference surface or radiation transmitted through the substantially-flat reference material. The process may also include spectrally analyzing at least an interference pattern of the radiation detected by each of the OCT probes to determine a topography of the substantially-flat reference surface. The process may also include positioning a slab of material on the chuck. The process may also include actuating the one or more elements within the two or more OCT probes at the same time to cause an operation through the two or more OCT probes. The operation may include irradiating the slab of material at at-least one location by the two or more OCT probes and synchronously detecting, by the two or more OCT probes, radiation reflected from the slab of material or radiation transmitted through the slab of material. The process may also include spectrally analyzing at least an interference pattern of the radiation detected by each of the OCT probes to determine a topography of the slab of material. The process may also include calibrating the topography of the slab of material by adjusting the topography of the slab of material based on the topography of substantially-flat reference surface.

In one embodiment, the present subject matter provides an apparatus for inspecting a slab of material, the slab of material including a passivation layer. The apparatus includes a frequency-domain optical-coherence tomography (OCT) probe configured to irradiate the slab of material at a location, and detect radiation reflected from the slab of material. The apparatus also includes a spectral-analysis module configured to analyze an interference pattern of the radiation detected by the OCT probe to thereby determine at least a thickness of the slab of material. The apparatus also includes a thin-film gauge configured to determine a thickness of the passivation layer of the slab of material at the location, such that the determined thickness of the slab of material at the location may be adjusted based on the thickness of the passivation layer.

In another embodiment, the present subject matter provides an apparatus for inspecting a slab of material, the slab of material including a passivation layer. The apparatus includes two or more frequency-domain optical-coherence tomography (OCT) probes configured to irradiate the slab of material at at-least one location, and detect radiation reflected from the slab of material and/or radiation transmitted through the slab of material. The apparatus also includes a centralized actuation-mechanism connected to the two or more OCT probes for actuating one or more elements in each of the two or more OCT probes at a same time during irradiation of the slab of material to cause a synchronized-detection of the radiation from the slab of material by the two or more OCT probes. The apparatus also includes a spectral-analysis module configured to analyze an interference pattern of the radiation detected by each of the OCT probes to thereby determine a thickness of the slab of material. The apparatus also includes a thin-film gauge configured to determine a thickness of the passivation layer of the slab of material at the location, such that the determined thickness of the slab of material at the location may be adjusted based on the thickness of the passivation layer.

In another embodiment, the present subject matter describes a process for inspecting a slab of material, the slab of material including a passivation layer. The process may include positioning the slab of material relative to a frequency-domain optical-coherence tomography (OCT) probe. The process may also include irradiating the slab of material at at-least one location by the OCT probe and detecting, by the OCT probe, first radiation reflected from the slab of material. The process may also include spectrally analyzing at least an interference pattern of the first radiation detected by the OCT probe to determine a thickness of the slab of material. The process may also include irradiating, by a thin-film gauge, the slab of material. The process may also include detecting, by the thin-film gauge, second radiation reflected from the slab of material. The process may also include spectrally analyzing the second radiation to determine a thickness of the passivation layer. The process may also include adjusting the determined thickness of the slab of material by subtracting the thickness of the passivation layer from the thickness of the slab of material.

In another embodiment, the present subject matter describes a process for inspecting a slab of material, the slab of material including a passivation layer. The process may include positioning the slab of material relative to two or more frequency-domain optical-coherence tomography (OCT) probes. The process may also include actuating one or more elements within the two or more OCT probes at a same time to cause an operation through the two or more OCT probes. The operation may include irradiating the slab of material at a location by the two or more OCT probes and synchronously detecting, by the two or more OCT probes, first radiation reflected from the slab of material and/or second radiation transmitted through the slab of material. The process may also include spectrally analyzing at least an interference pattern of the first radiation and/or the second radiation detected by each of the OCT probes to determine a thickness of the slab of material. The process may also include irradiating, by a thin-film gauge, the slab of material. The process may also include detecting, by the thin-film gauge, third radiation reflected from the slab of material. The process may also include spectrally analyzing the third radiation to determine a thickness of the passivation layer. The process may also include adjusting the thickness of the slab of material by subtracting the thickness of the passivation layer from the thickness of the slab of material.

The present subject matter employs multiple synchronized FD-OCT probes to achieve an increased-throughput of a tool configured to characterize slab properties and reduce the influence of vibration over the results of measurement at-least due to a fast handling mechanism for the slab of material. Additionally or alternatively, the present subject matter determines a thickness and/or topography of each layer of a slab of material including multiple layers, for example, a metal layer and a passivation layer.

To further clarify advantages and features of the invention claimed herein, example descriptions and embodiments are rendered by reference to specific embodiments thereof, which is illustrated in the appended drawings. It is appreciated that these drawings depict only example embodiments of the invention and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
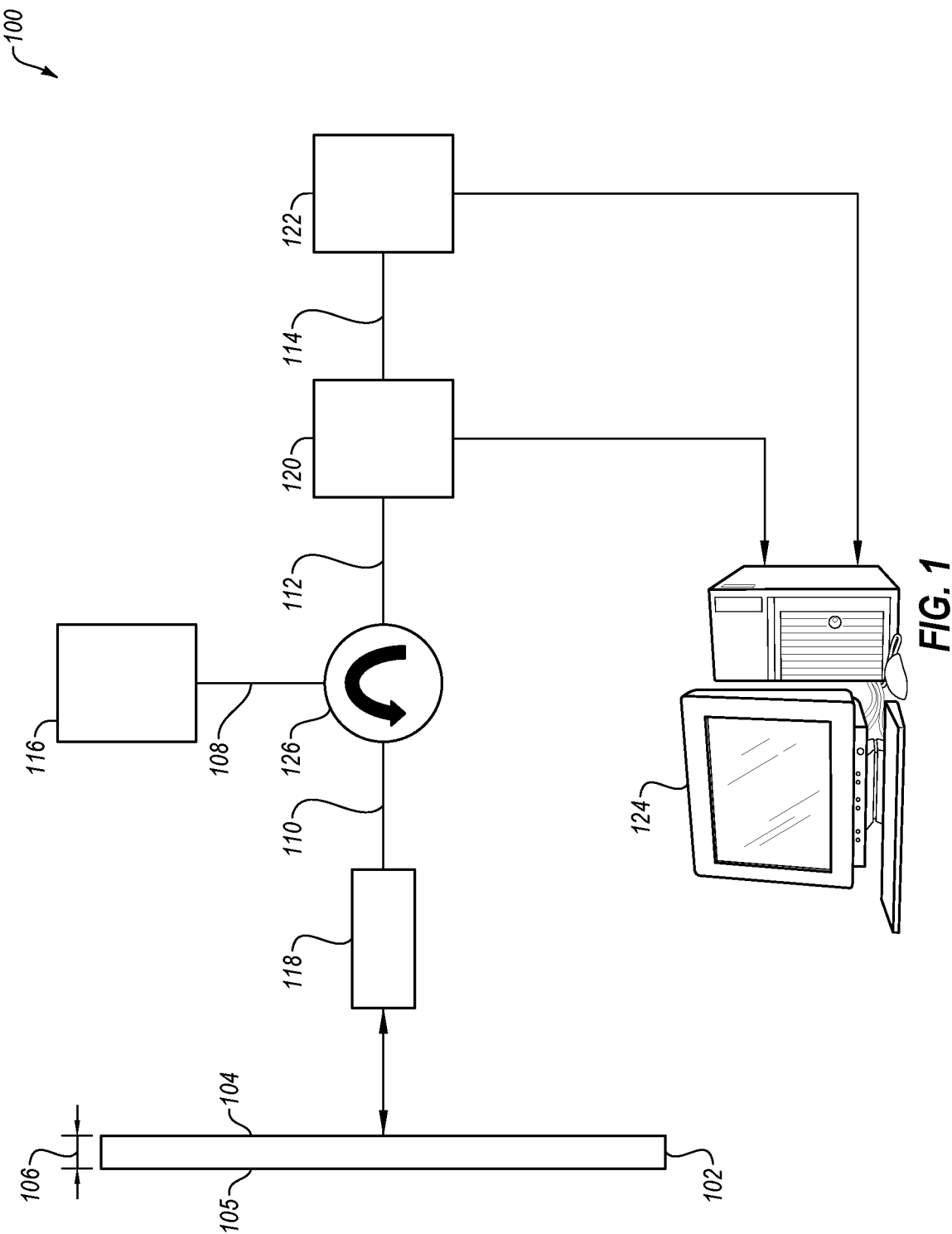
FIG. 1 illustrates an example representation of system within a probe operating as a frequency domain optical coherence tomography (FD-OCT) probe.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Embodiments of the present disclosure will be described below in detail with reference to the accompanying drawings.

FIG. 1 illustrates an example representation of a system 100 or arrangement within a probe operating as a frequency domain optical coherence tomography (FD-OCT) probe for measuring one or more properties of a slab of material 102. In some embodiments, the slab of material 102 may be any suitable piece of material that may have a relatively flat surface. For example, the slab of material 102 may be a silicon wafer, a semiconductor wafer, a glass plate or glass sheet (e.g., glass sheets used for wafer carriers, windows, flat panel displays, etc.), a polyester sheet (e.g., used for flexible panel displays), a polyimide sheet (e.g., used for flexible panel displays), sheet metal, a sandwich of various materials, such as those discussed above, or any other relatively flat element in which measuring properties of the element such as thickness or topography may be performed. A description and example of the system 100 can also be found at-least with respect to embodiments defined under FIG. 1 of the U.S. patent application Ser. No. 15/410,328, filed Jan. 19, 2017, the complete-disclosure of which is incorporated herein by reference in its entirety.

The system 100 configured to inspect the slab of material 102 is arranged within the FD-OCT probe and accordingly denotes an internal assembly. In general, the system 100 may be configured to inspect the slab of material 102 in order to determine one or more properties of the slab of material 102 such as, for example, a thickness 106 of the slab of material 102 and a topography of a front surface 104 and/or a back surface 105 of the slab of material 102. To perform the inspection, the system 100 may include single mode optical fibers 108, 110, 112, and 114, a broadband light source 116, a beam forming assembly 118, a directional element 126, and an etalon filter 120 and a spectrometer 122 both controlled by a computer 124.

The broadband light source 116 may be configured to emit light over the optical fiber 108. The directional element 126 may be configured to receive the light from the broadband light source 116 over the optical fiber 108 and direct the light to the beam assembly 118 over the optical fiber 110. The beam assembly 118 may be configured to receive the light over the optical fiber 110 and direct the light toward the slab of material 102, i.e. irradiate the slab of material 102. The beam assembly 118 may be further configured to receive the light reflected from the irradiated slab of material 102 and direct the light back to the directional element 126 over the optical fiber 110. The etalon filter 120, as controlled by the computer 124, may be configured to receive the light over the optical fiber 112 after the light has been reflected from the slab of material 102, filter the light, and direct the light over the optical fiber 114. The spectrometer 122, as controlled by the computer 124, may be configured to receive the light over the optical fiber 114, after the light has been filtered by the etalon filter 120 and after the light has been reflected from the slab of material 102, and spectrally analyze the light. More specifically, the spectrometer 122 may be coupled to one-dimensional array-detector (e.g. a charge coupled device) to capture electric-charge corresponding to an interference pattern (e.g., an interferogram) formed due to interference among the diffracted-frequencies due to dispersion of reference and reflected light within the spectrometer 122. The interferogram as obtained from the array-detector is used for spectral-analysis of the reflected-light from the slab of material 102. In some examples, the one dimensional array detector may be in-built within the spectrometer 122.

The spectral analysis of the light may include determining topography of the front surface 104 and/or the back surface 105 of the slab of material 102 and/or determining the thickness 106 of the slab of material 102 including determining a thickness of one or more layers of the slab of material. For such purposes, the computer 124 may be electrically coupled to the etalon filter 120 and to the spectrometer 122, and operates as a spectral-analysis module. The computer 124 may be configured to determine the thickness 106 of the slab of material 102, the thickness of the layers of the slab of material, and/or determining a topography of the front-surface 104 the back surface 105 of the slab of material 102.

The computing-device 124 executes instructions to perform operations with respect to the spectrometer 122 in order to determine a topography of the front surface 104 and/or the back surface 105 of the slab of material 102 and/or determine the thickness 106 of the slab of material 102. In an example, the instructions to measure the thickness 106 of the slab of material 102 correspond to the following sequential-procedure as illustrated with respect to FIG. 1 in U.S. patent application Ser. No. 15/410,328:

1. Measurement of the reference spectrum (as shown in FIG. 9A of U.S. patent application Ser. No. 15/410,328) of the broadband light source 116
2. Measurement the signal spectrum (as shown in FIG. 9B of U.S. patent application Ser. No. 15/410,328) of the light reflected from the slab of material 102 having a known refractive index n, and passing through the etalon filter 120 having a known thickness which is known to be slightly larger than the thickness 106 of the measured slab of material 102.
3. Calculating a normalized spectrum (as shown in FIG. 9C of U.S. patent application Ser. No. 15/410,328) by dividing the signal spectrum by the reference spectrum.
4. Calculating the frequency $\Omega$ of observed oscillations in the normalized spectrum.
5. Calculating the thickness 106 of the slab of material 102 using Equation 34 of U.S. patent application Ser. No. 15/410,328.

The topography of the front surface 104 of the slab of material 102 may be determined by placing the slab of material 102 on an XY motion stage perpendicular to light beam impinging front surface 104, wherein the front surface 104 is parallel to plane of motion of XY stage, and by collecting a data-set comprising the data set on a large number M comprising the $x_j$ and $y_j$ coordinates of the point where the beam is impinging the front surface 104 of the slab of material 102 and the distance between the a stationary lens (shown in FIG. 4 as 404) of the beam-forming assembly 118 and the front surface 104 of the slab of material 102 $z_j$, where $j=1 \ldots M$. The set of points $(x_j, y_j, z_j)$ can then be used to construct a three dimensional map of the front surface 104 of the slab of material 102. A similar procedure may be performed to determine the topography of the back surface 105 of the slab of material 102.

Figure 2:
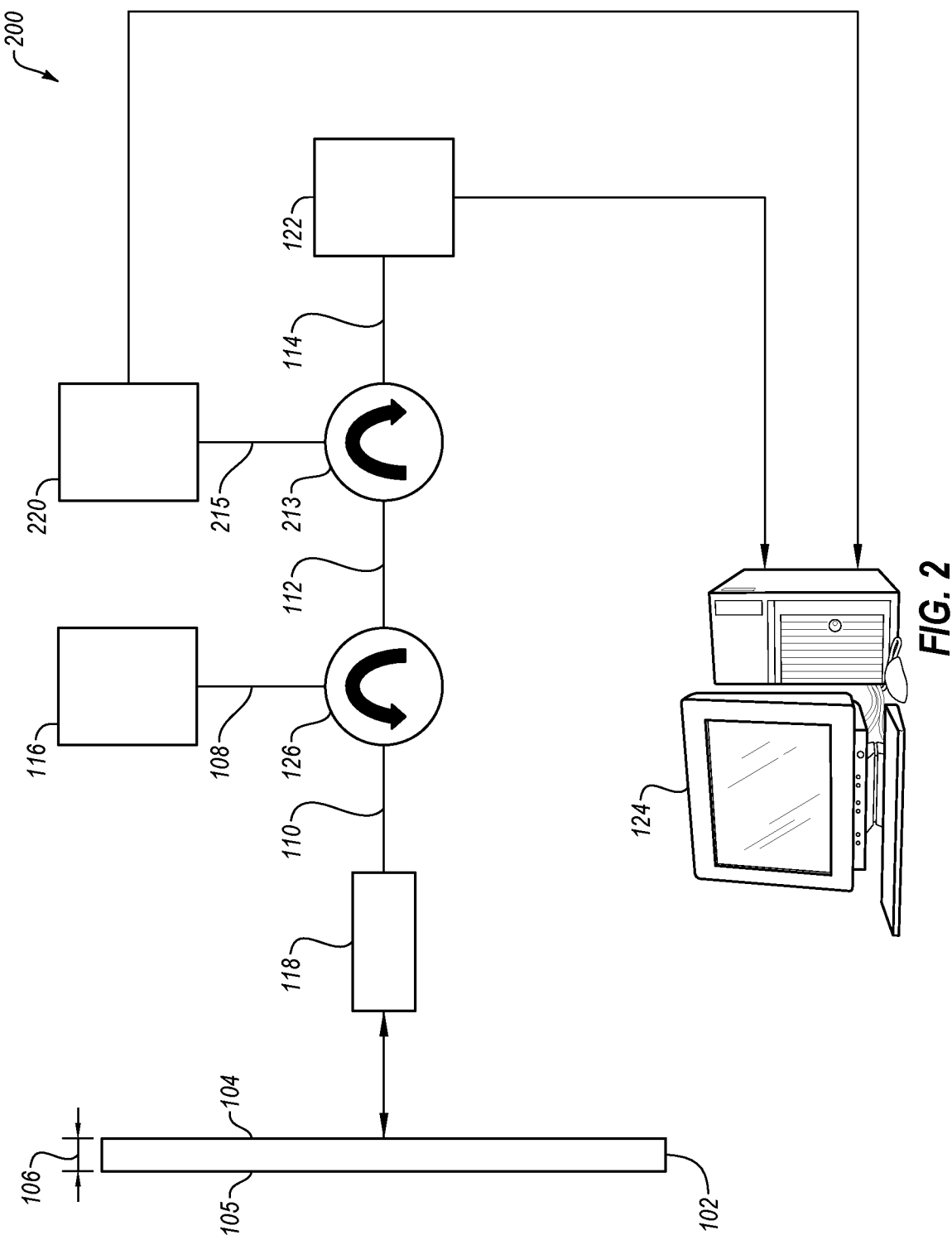
FIG. 2 illustrates a second example representation of a system within the probe operating as the FD-OCT probe.

FIG. 2 illustrates another example system 200 or arrangement within the one probe operating as the FD-OCT probe for inspecting a slab of material. A description and example of the system 200 may also be found at least with respect to embodiment defined under FIG. 2 of the aforesaid U.S. patent application Ser. No. 15/410,328.

The system 200, in addition to components referred with the system 100, further includes a second directional element 213, an etalon filter 220, and a single mode optical fiber 215. The second directional element 213 may be configured to receive the light from the directional element 126 over the optical fiber 112 and direct the light to the etalon filter 220 over the optical fiber 215. The etalon filter 220 may be configured similarly to the etalon filter 120 of FIG. 1, except that the etalon filter 220 may be configured to receive the light from the second directional element 213 over the optical fiber 215 after the light has been reflected from the irradiated slab of material 102 and direct the light back to the second directional element 213 over the optical fiber 215. The spectrometer 122 of the system 200 may then be configured to receive the light from the second directional element 213 over the optical fiber 114.

Figure 3:
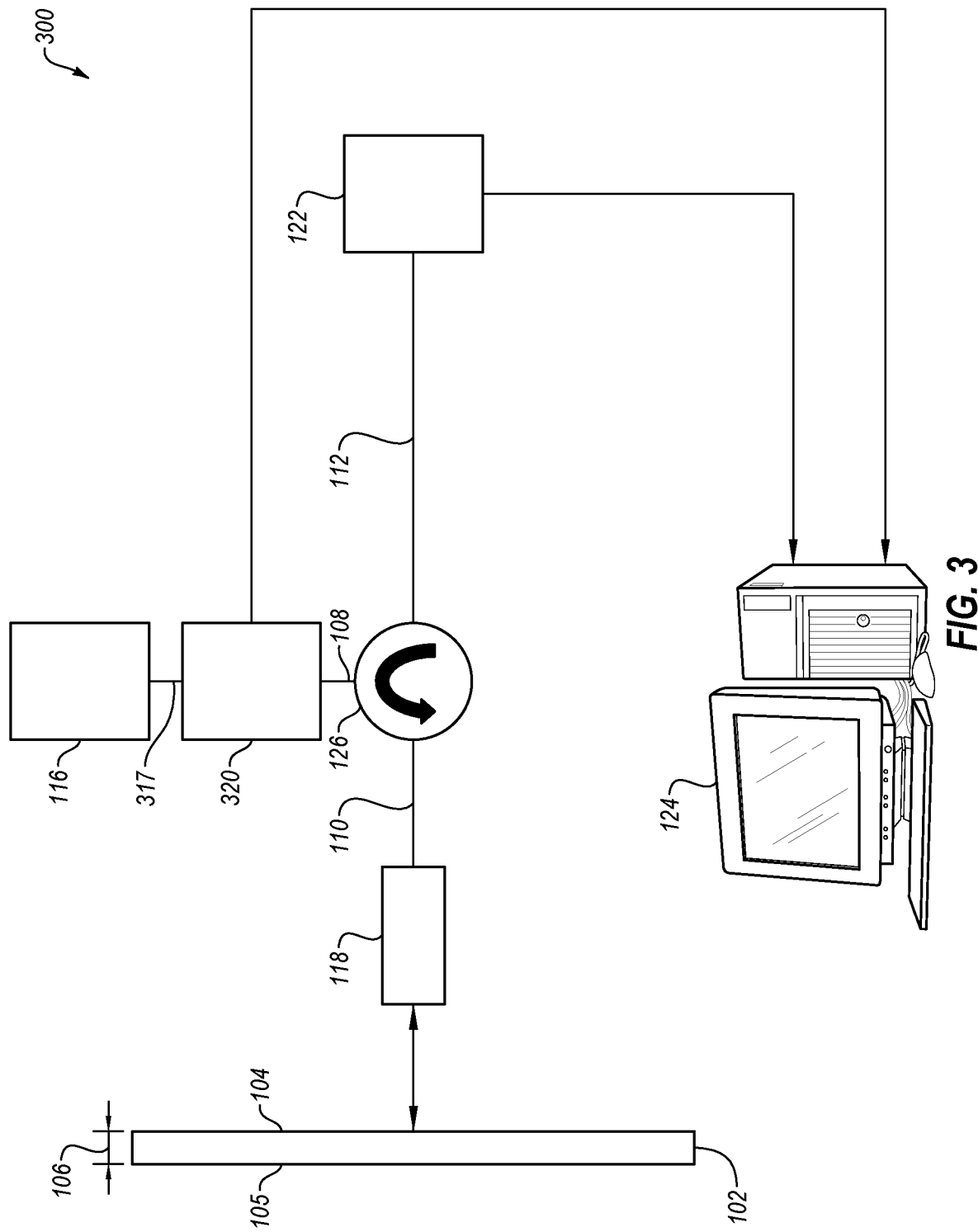
FIG. 3 illustrates a third example representation of a system within the probe operating as the FD-OCT probe.

FIG. 3 illustrates a third example representation of a system 300, within the probe operating as the FD-OCT probe, for inspecting the slab of material, arranged in accordance with at least some embodiments described in this disclosure. An example description of the system 300 may also be found at least with respect to embodiment defined under FIG. 3 of the aforesaid U.S. patent application Ser. No. 15/410,328.

The system 300, in addition to elements in common with the system 100, may include a single mode optical fiber 317 and an etalon filter 320. The etalon filter 320 may be configured similarly to the etalon filter 120 of FIG. 1, except that the etalon filter 320 may be configured to receive the light over the broadband light source 116 over the optical fiber 317 before the light is directed toward the slab of material 102 and then, after filtering the light, direct the light over the optical fiber 108 to the directional element 126. Then, after the light has been reflected from the slab of material 102, the spectrometer 122 may be configured to receive the light from the directional element 126 over the optical fiber 112.

Figure 4:
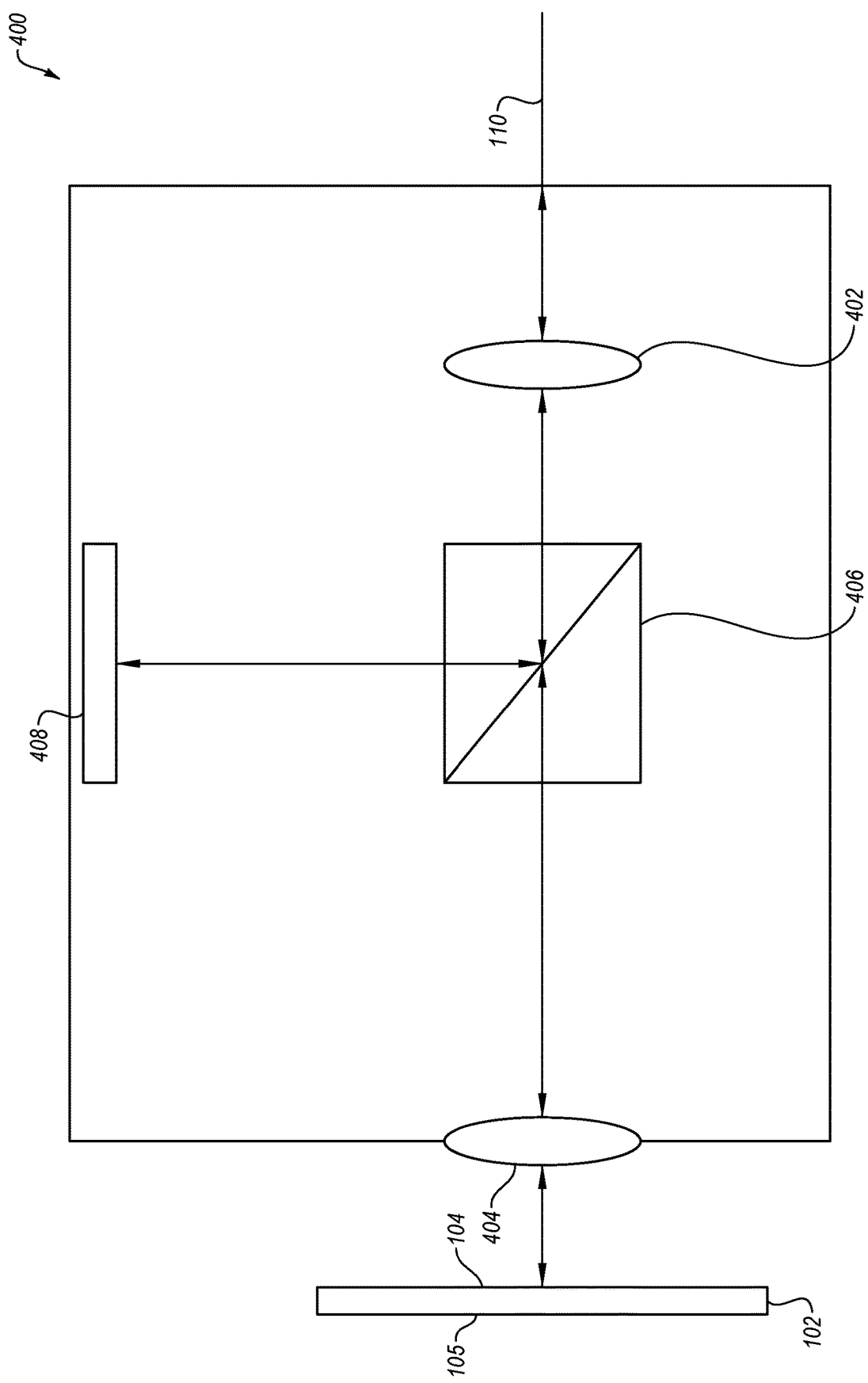
FIG. 4 illustrates an example beam-assembly that may be implemented within the systems of FIG. 1-3.

FIG. 4 illustrates an example beam assembly 400 containing a reference plane enabling absolute distance metrology, arranged in accordance with at least some embodiments described in this disclosure and implementable within the systems of FIG. 1-3 of the present subject matter. An example description of the assembly 400 can also be found at least with-respect to a beam-assembly 500, as defined under FIG. 5 within the aforesaid U.S. patent application Ser. No. 15/410,328.

The beam assembly 400 may be employed as the beam assembly 118 in the systems 100, 200 and 300 of FIG. 1 through FIG. 3. The beam assembly 400 may include lenses 402 and 404. The beam assembly 400 may also optionally include a beam splitter 406 and a reflector 408. The lens 402 may be configured to receiving the light over the optical fiber 110 and collimate and direct the light toward the beam splitter 406. The beam splitter 406 may be configured to split the light from the lens 402 into first and second portions, direct the first portion of the light toward the lens 404, and direct the second portion of the light onto a reflector 408. The lens 404 may be configured to receive the first portion of the light from the beam splitter 406, direct the first portion of the light toward the slab of material 102, and direct the first portion of the light after being reflected from the slab of material back toward the beam splitter 406. Further, the reflector 408 may be configured to receive the second portion of the light from the beam splitter 406 and reflect the second portion of the light back toward the beam splitter 406. The beam splitter 406 may be further configured to combine the first portion of the light after being reflected from the slab of material 102 and the second portion of the light after being reflected from the reflector 408, and then direct the combined light toward the lens 402. Finally, the lens 402 may be configured to receive the combined light and direct the combined light over the optical fiber 110.

The beam assembly 400 may be employed to gauge the optical path difference (OPD) between the first portion of the light and the second portion of the light, which can be used to measure the distance between the front surface 104 of the slab of material 102 and the lens 404. As has been depicted with respect to the description in FIG. 1, distance between the front surface 104 of the slab of material 102 and the lens 404 assists in determination of topography of front and back surfaces of the slab of material 102.

Figure 5:
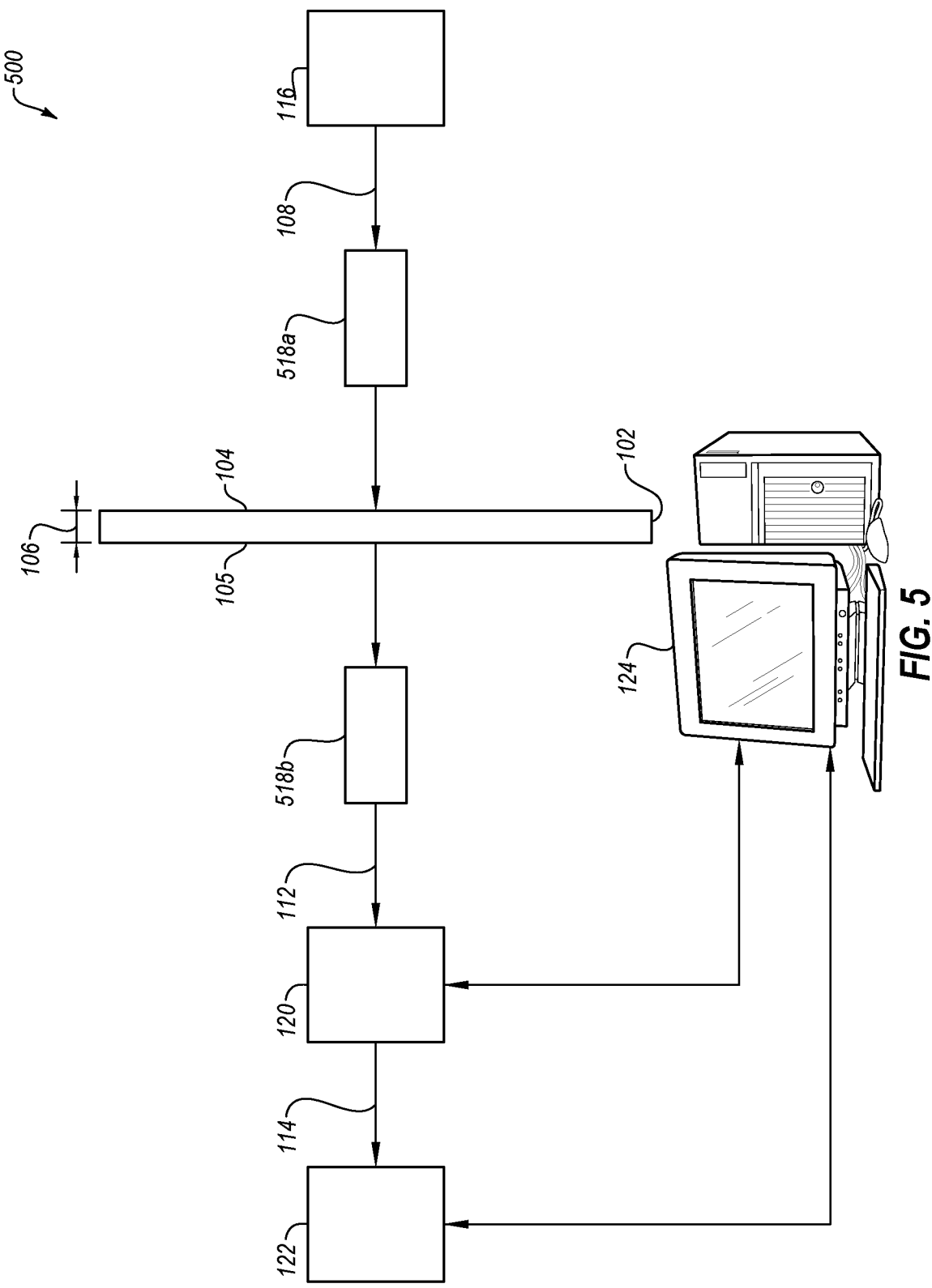
FIG. 5 illustrates a fourth example representation of a system within the probe acting as the FD-OCT probe.

FIG. 5 illustrates a fourth example system 500 within the FD-OCT probe for inspecting a slab of material, in accordance with at least some embodiments described in this disclosure. An example description of said system 500 can also be found at least with-respect to the system as defined under FIG. 4 of the aforesaid U.S. patent application Ser. No. 15/410,328.

Although the beam splitter 406 and the reflector 408 may be beneficial in some embodiments of the beam assembly 400 as noted above with respect of FIG. 4 of the present subject matter, the present FIG. 5 omits the beam splitter 406 and the reflector 408. For example, in addition to elements in common with the system 100, the system 500 may include a first beam assembly 518a and a second beam assembly 518. Since the light only passes through the beam assemblies 518a and 518b in a single direction in the system 500, the beam splitter 406 and the reflector 408 (otherwise present in FIG. 4 of the present subject matter) may be omitted.

More specifically, the beam assembly 518a may be similar to the beam assembly 118 of FIG. 1 except that the beam-assembly 518a is not configured to receive the light reflected back from the slab of material 102. Instead, the light directed from the beam assembly 518a is transmitted through the slab of material 102 toward the second beam assembly 518b. The second beam assembly 518b may be configured to receive the light transmitted through the slab of material 102 and direct the light to the etalon filter 120 over the optical fiber 112. The etalon filter 120 may then be configured to receive the light from the second beam assembly 518b over the optical fiber 112 after the light has been transmitted through the slab of material 102. Accordingly, the characterization of the slab of material 102 in the present FIG. 5 is based on light transmitted through the slab of material 102.

Figure 6:
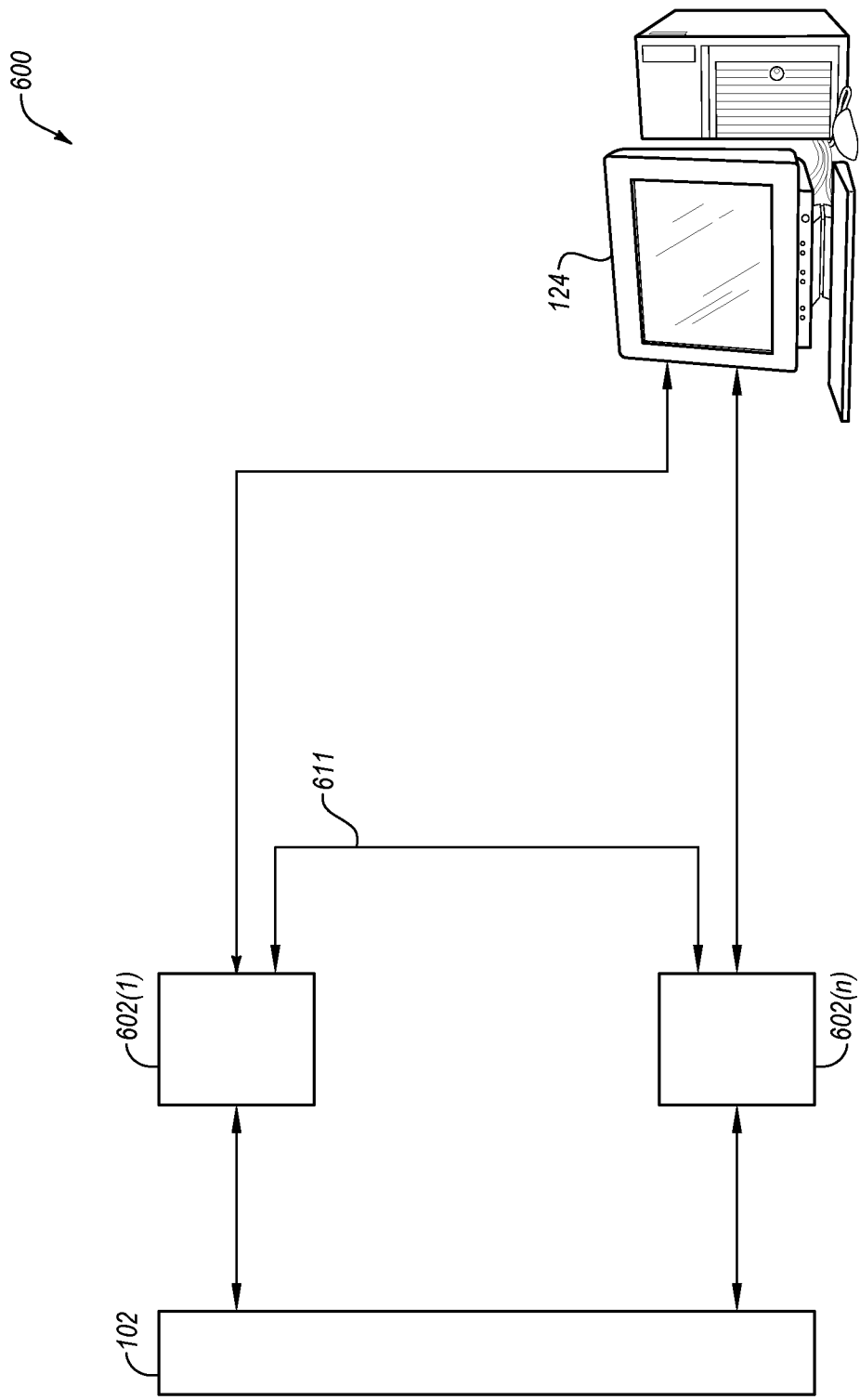
FIG. 6 illustrates a system comprising synchronized multiple FD-OCT probes for simultaneous measurement of properties of a slab of material.

FIG. 6 illustrates a system 600 comprising multiple synchronized FD-OCT probes for simultaneous measurement of properties of a slab of material. More specifically, FIG. 6 describes multiple probes 602(1) . . . 602(n) for acquiring data synchronously for measurement of thickness and topography of the slabs of material. The assembly of each of said FD-OCT probe 602 (1 to n) within the system 600 corresponds to the systems 100, 200, 300 and 500 as have been referred in the previous figures, wherein each of the probe 602 is an assembly of single mode optical fibers 108, 110, 112, 215, 317 and 114, the broadband light source 116, the beam forming assembly 118, the directional elements 126, 213, the etalon filter 120, 320 and the spectrometer 122. Further, all of the FD-OCT probes 602 in the system 600 measure a common slab of material 102 and connected to the common spectral-analysis module or the computing system 124. For sake of brevity, only two FD-OCT probes 602(1) and 602(n) have been shown as a part of the system 600.

Within the present system 600, the upper FD-OCT probe 602(1) is synchronized with lower FD-OCT probe 602(n) by means of a centralized actuation mechanism 611 or a common electrical-cable 611 whose one end is connected to all the FD-OCT probes. The other end of such electrical-cable 611 is connected to a triggering source (e.g. a microcontroller) that sends pulses to actuate each of said FD-OCT probes at the same time such that the FD-OCT probes simultaneously detect the reflected radiation from the slab of material 102 and thereby enable a simultaneous measurement of distances from the slab of material 102 to each of the FD-OCT probes. In the present disclosure, reference to operations happening "simultaneously" or "at the same time" or being "synchronized" allows for margins of error in the simultaneous nature of, that may be less than 1%, 5%, or 10% depending on various implementation or materials constraints. Accordingly, upon having received a trigger through the electrical cable 611, each of the probe out of the plurality of FD-OCT probes 602 (1 to n) operates simultaneously. In other example, the actuation mechanism 611 may be electro-mechanical, opto-electrical or opto-mechanical in nature. Largely, the simultaneous operation the each of the probe 602 may be defined as a sequential-operation of:

a) irradiating the slab of material at a particular location;
b) detecting radiation reflected from the slab of material or transmitted there-through;

Further, as may be understood with respect to FIG. 6, each of plurality of the probes 602 (1 to n), inter alia, includes a combination of spectrometer 122 and uni-dimensional array detector 124. In other words, each of the probes 602 includes a respective spectrometer-array detector combination, wherein the spectrometer and array detector may either be integrated or separate from each other.

Figure 7:
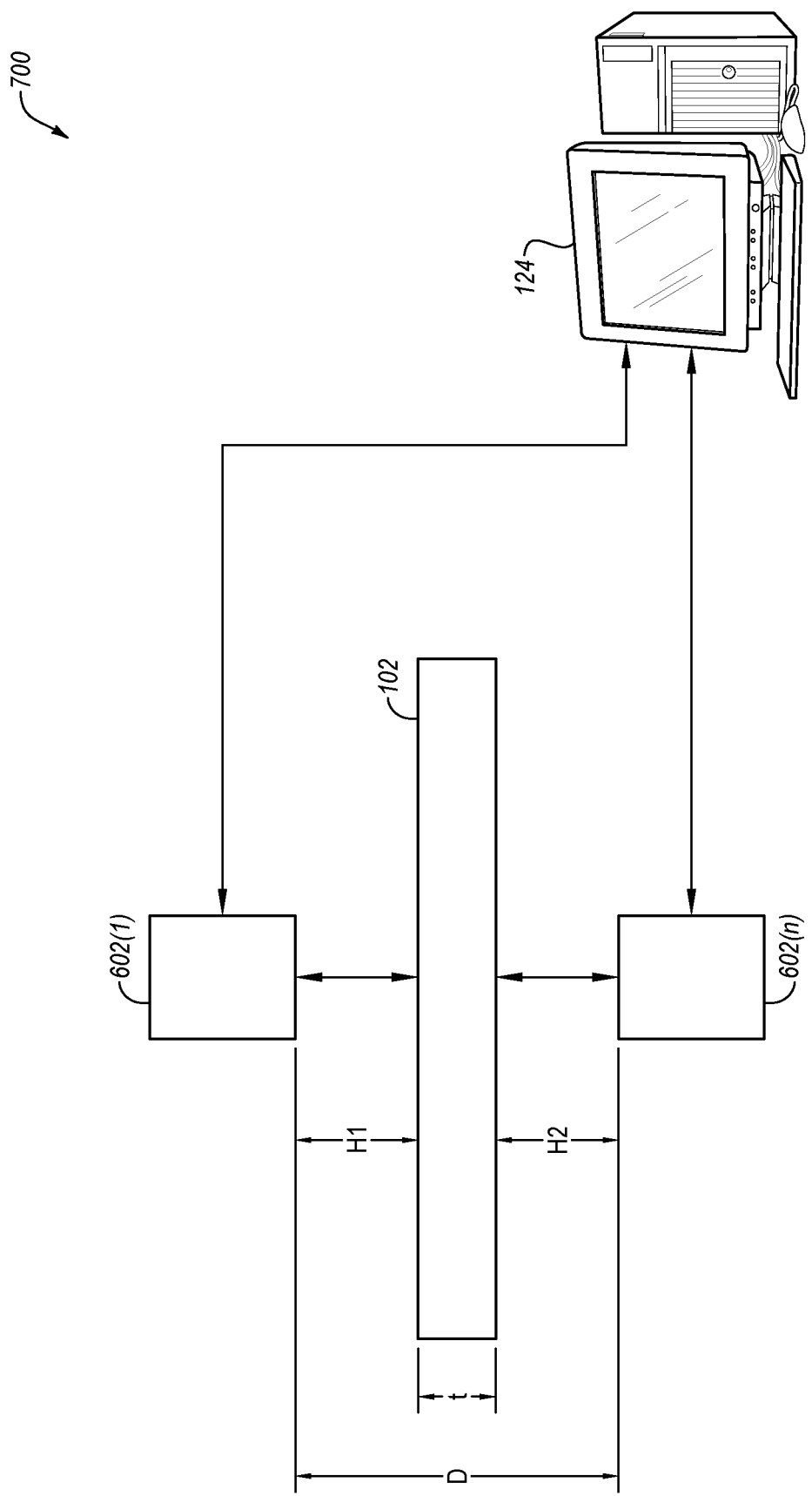
FIG. 7 illustrates a symmetric arrangement of two FD-OCT probes for measurement of the transparent and non-transparent slabs of materials for reduction of the noise caused by vertical mechanical vibration of a slab of material.

FIG. 7 illustrates a symmetric arrangement of two FD-OCT probes for measurement of the transparent and non-transparent slabs of materials for reduction of the noise caused by vertical mechanical vibration of a slab of material. More specifically, FIG. 7 illustrates a system 700 of FD-OCT probes for the purposes of reducing the influence of mechanical vibrations of the slab of material 102 during the course of determining thickness of the slab of material 102, which may be transparent, semi-transparent, or non-transparent in nature. As shown in FIG. 7, the system 700 comprises a pair of probes 602(1) and 602(2). 'D' represents a distance between the two probes 602(1) and 602(2) that may be pre-determined through any known means. Further, the distances H1 and H2, respectively depict the distance of the slab of material 102 from the first probe 602(1) and the second probe 602(2). Said distances are determined based on the spectral analysis performed with respect to each of the probe 602(1) and 602(2), as illustrated through the procedure illustrated in FIG. 1. Thereafter, the thickness 't' of the slab of material 102 is determined based on following criteria (as illustrated in U.S. Pat. No. 7,116,429):

$$t=D-H1-H2$$

The simultaneous calculation of H1 and H2 owing to a synchronized operation of the probe 602(1) and 602(2) coupled with a symmetric arrangement of probes 602(1) and 602(2) with respect to the slab of material 102 causes a precise determination of distances H1 and H2 and thereby a precise determination of the thickness 't'. Such measurement overcomes the influence of mechanical vibrations of the slab of material 102 during the course of determining thickness of the slab of material 102.

Figure 8:
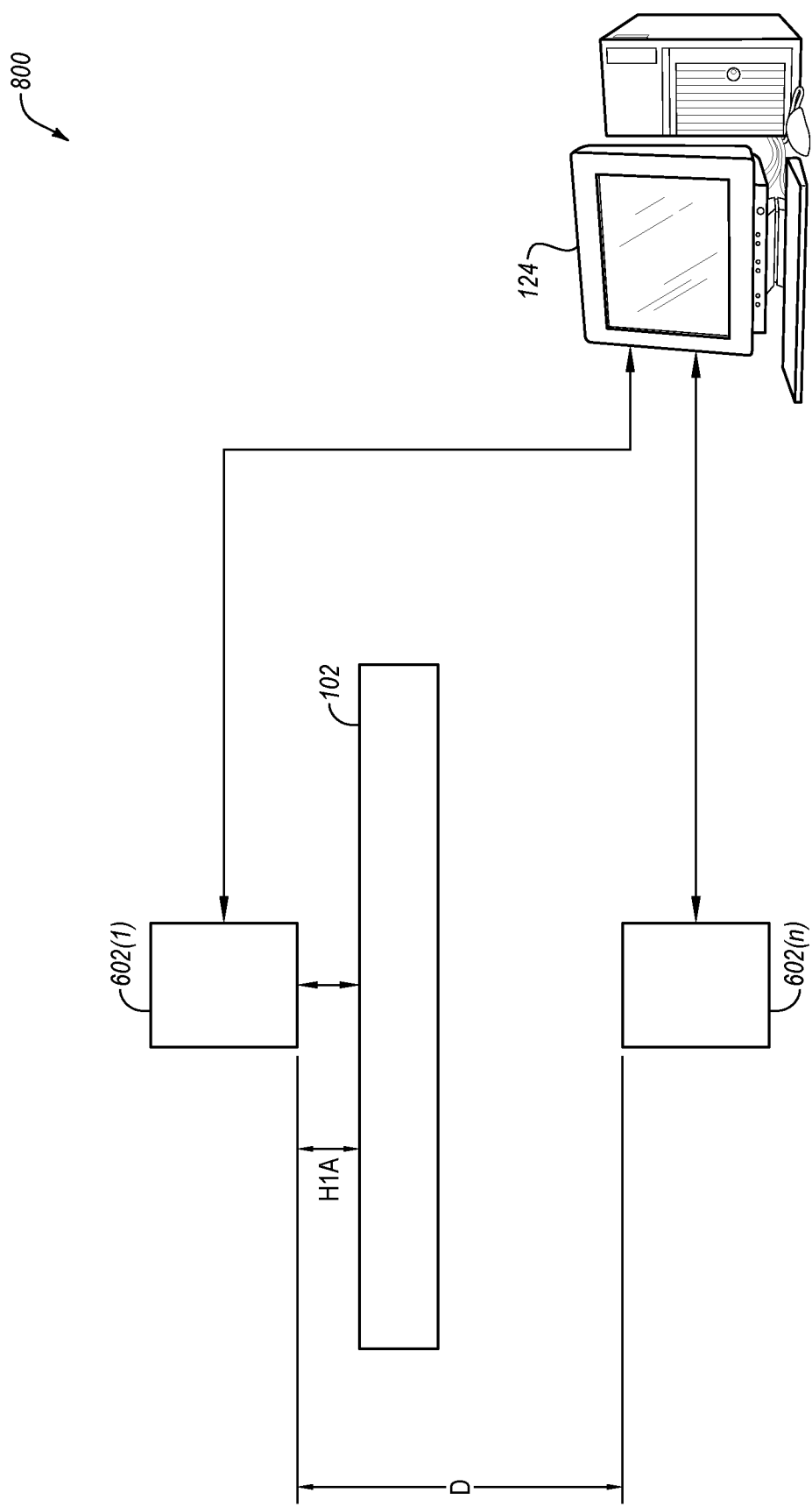
FIG. 8 illustrates a type of asymmetric arrangement of two FD-OCT probes resulting from the relative motion of the slab of material with respect to probes due to vibration during the first portion of the vibration with respect to the slab of material.

FIG. 8 illustrates a type of asymmetric arrangement of two FD-OCT probes resulting from the relative motion of the slab of material with respect to probes due to vibration during the first portion of the vibration with respect to the slab of material.

Figure 9:
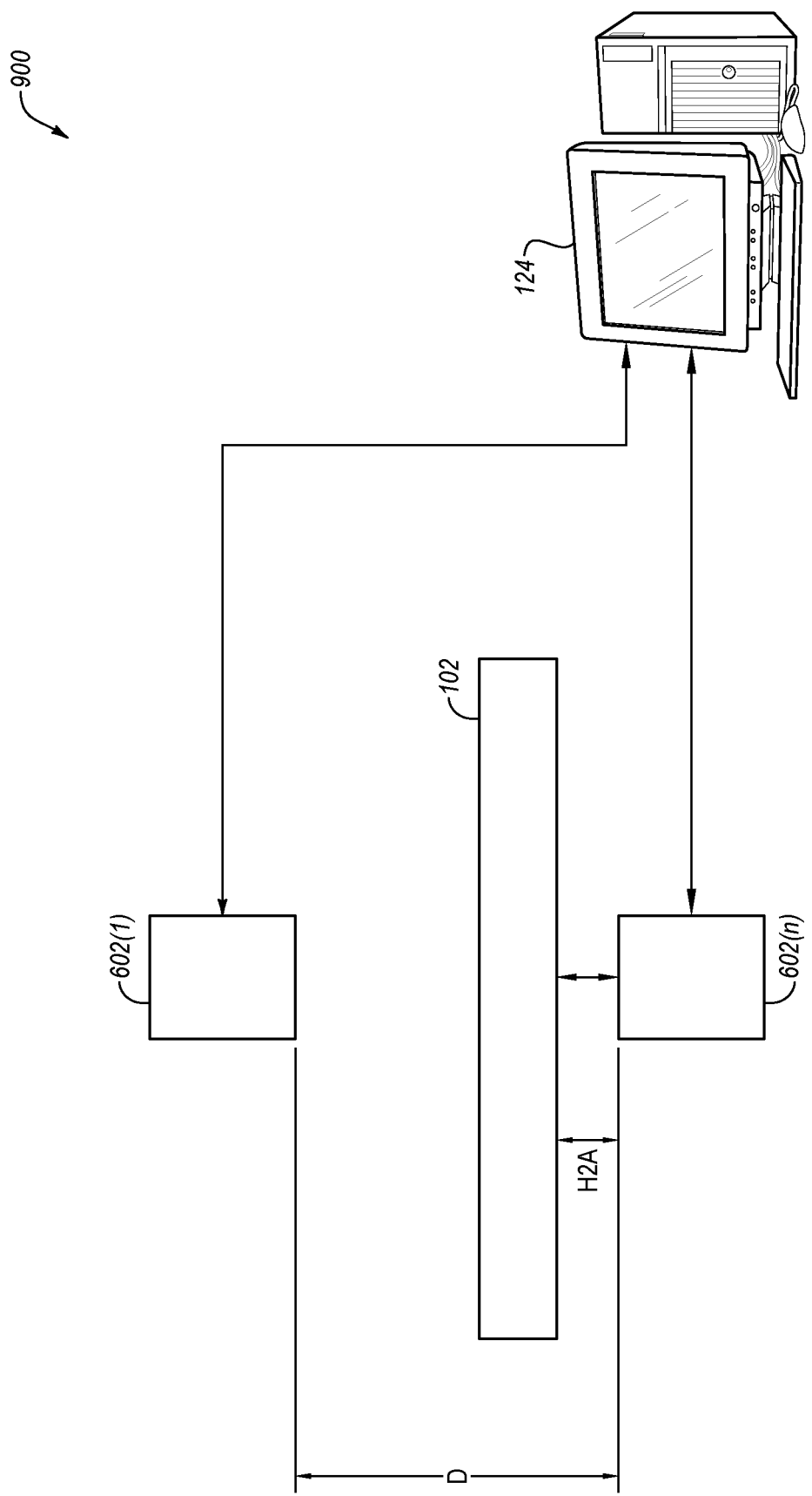
FIG. 9 illustrates another type of asymmetric arrangement of two FD-OCT probes with respect to the slab of material, resulting from motion of the slab of material due to vibration during the second portion of vibration cycle shown in FIG. 8.

On the other hand, FIG. 9 illustrates another type of asymmetric arrangement of two FD-OCT probes with respect to the slab of material, resulting from motion of the slab of material due to vibration during the second portion of vibration cycle shown in FIG. 8.

Both FIG. 8 and FIG. 9 illustrate a non-synchronized arrangement of the probes 602(1) and 602(2), as a result of which both probes determine the distance from the slab of material 102 at different instants of time, say at t1 and t2, respectively. As illustrated in FIG. 8, at time 't1', the distance between probe 602(1) and the slab of material 102 is observed to be H1A. As illustrated in FIG. 9, at time 't2', the distance between probe 602(2) and the slab of material 102 is observed to be H2A. The asymmetric arrangement of two FD-OCT probes as depicted in FIG. 8 and FIG. 9 result from the relative motion of the slab of material with respect to probes due to vibration upwards and downwards, respectively. Such upward and downward vibration may also be referred as first and second portion of the vibration or vibratory-motion. Based on said readings, the thickness 'tA' gets determined as follows:

$$tA=D-H1A-H2A$$

Figure 10:
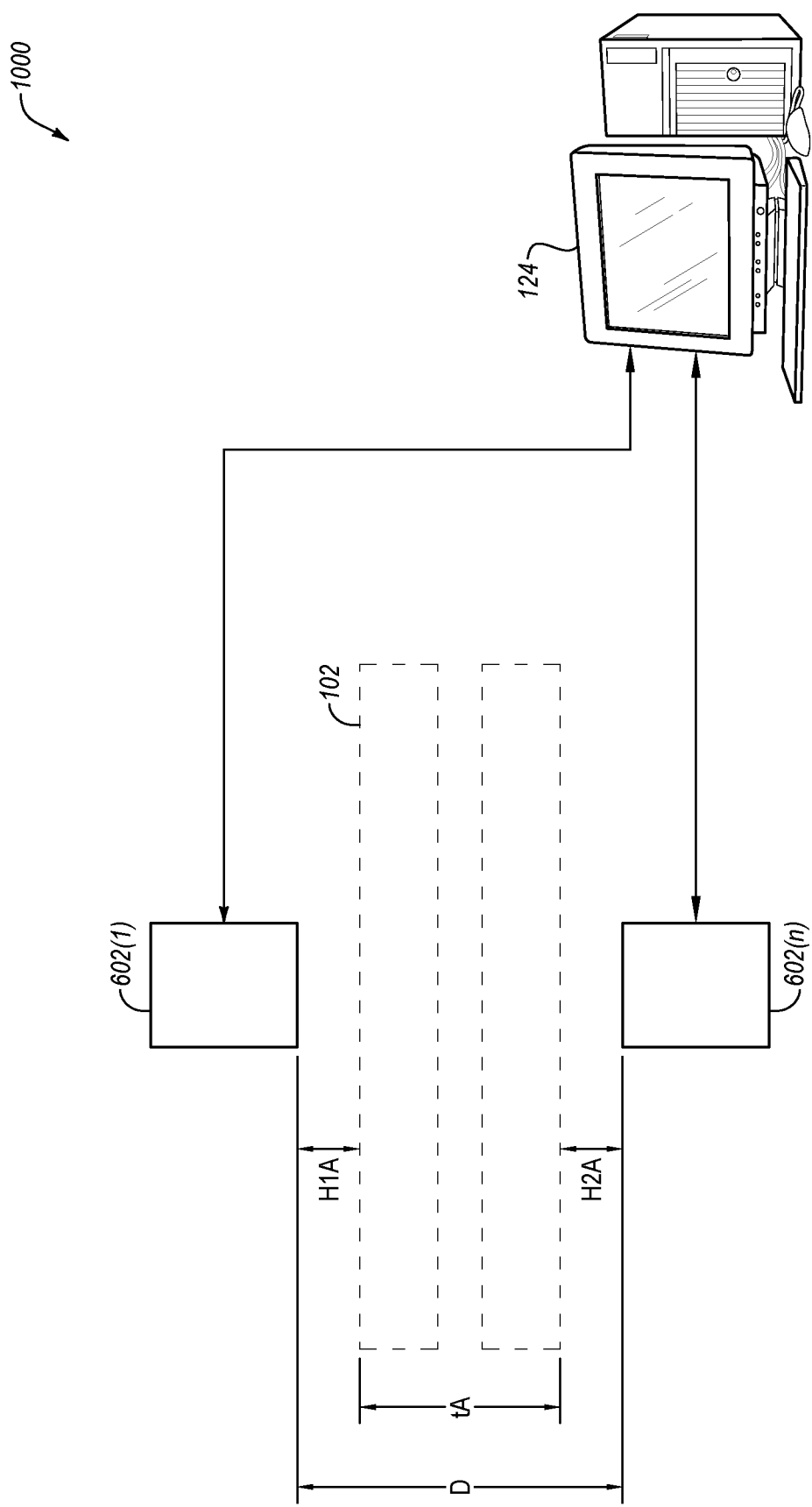
FIG. 10 illustrates occurrence of error during a slab-thickness measurement in case of the arrangement of the FD-OCT probes as depicted in FIG. 8 and FIG. 9 resulting from the vibratory-motion of the slab of material with respect to the FD-OCT probes.

FIG. 10 illustrates occurrence of error during a slab-thickness measurement in case of the arrangement of the FD-OCT probes as depicted in FIG. 8 and FIG. 9 resulting from the vibratory-motion of the slab of material with respect to the FD-OCT probes. Clearly, as indicated in FIG. 10, thickness 'tA' is substantially greater than the actual thickness 't' of the slab of material 102 and gets determined as a substantially high thickness of the slab of material 102 owing to a continuous-vibration of the slab of material 102 with respect to the probes along y axis and non-synchronized operation of the probes 602(1) and 602(2). Accordingly, as may be understood, the synchronized operation of the probes 602(1) and 602(2) is able to determine the precise thickness 't' despite the vibration of the slab of material 102 by virtue of measurement of the distances H1 and H2 as the same instant of time.

Figure 11:
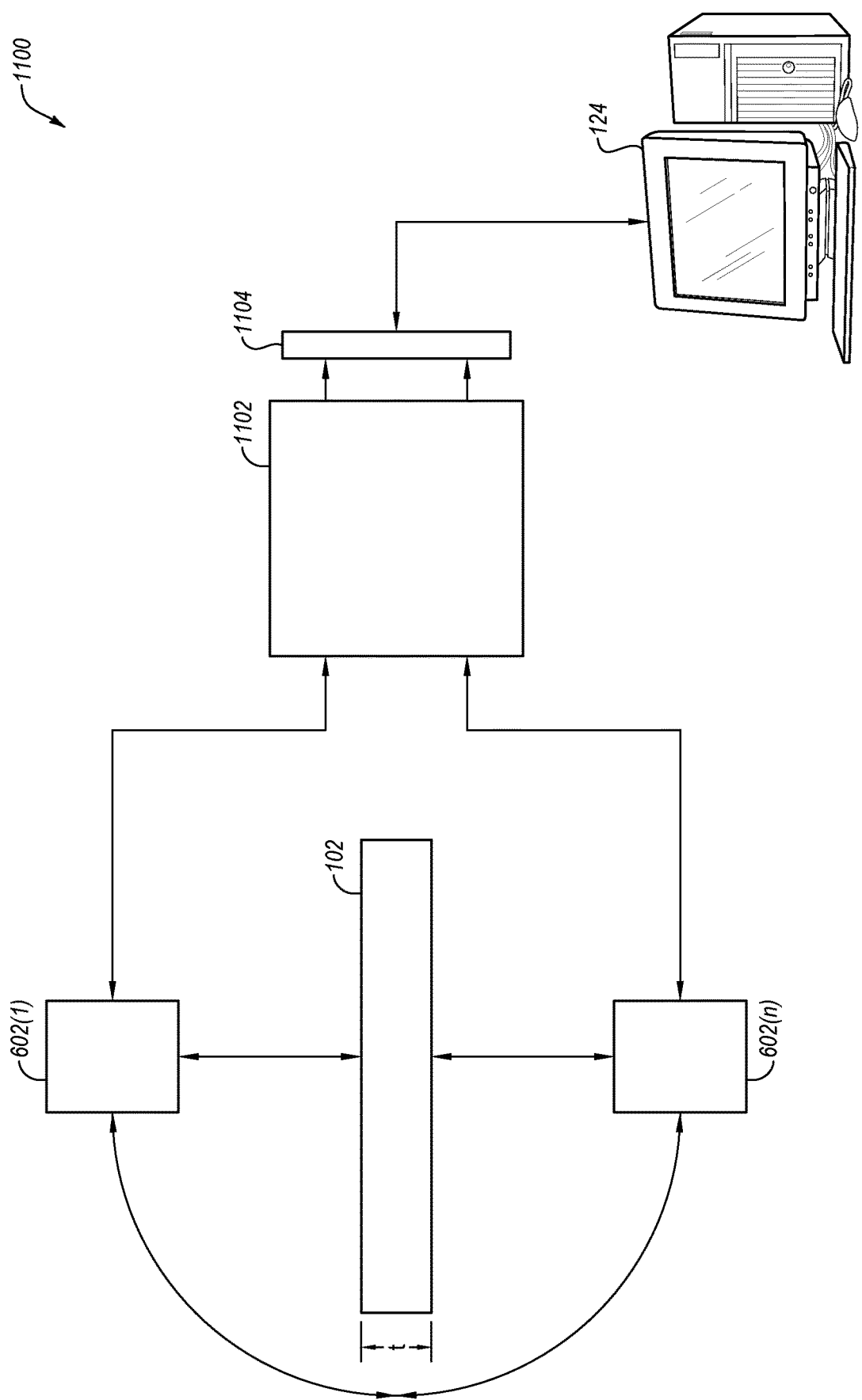
FIG. 11 illustrates synchronized FD-OCT probes utilizing a spectrometer-detector combination for measurement of properties of a slab of material.

FIG. 11 illustrates synchronized FD-OCT probes utilizing a spectrometer-detector combination for measurement of properties of a slab of material. More particularly, the system 1100 depicted in FIG. 11 has synchronized FD-OCT probes 602 utilizing a centralized or sole spectrometer-detector combination for measurement of thickness and topography of slabs of material. More specifically, neither of the FD-OCT probes 602 in the system 1100 comprises an in-built spectrometer and detector combination. Instead, each of the probes 602 is rather aligned to a centralized spectrometer 1102 and detector 1104, thereby incurring significantly lower manufacturing costs when compared with the system 600. Further, the detector 1104 within the system is a 2 dimensional (2D) array detector, e.g., a charge coupled device having multiples rows of photo-sensitive elements.

Figure 12:
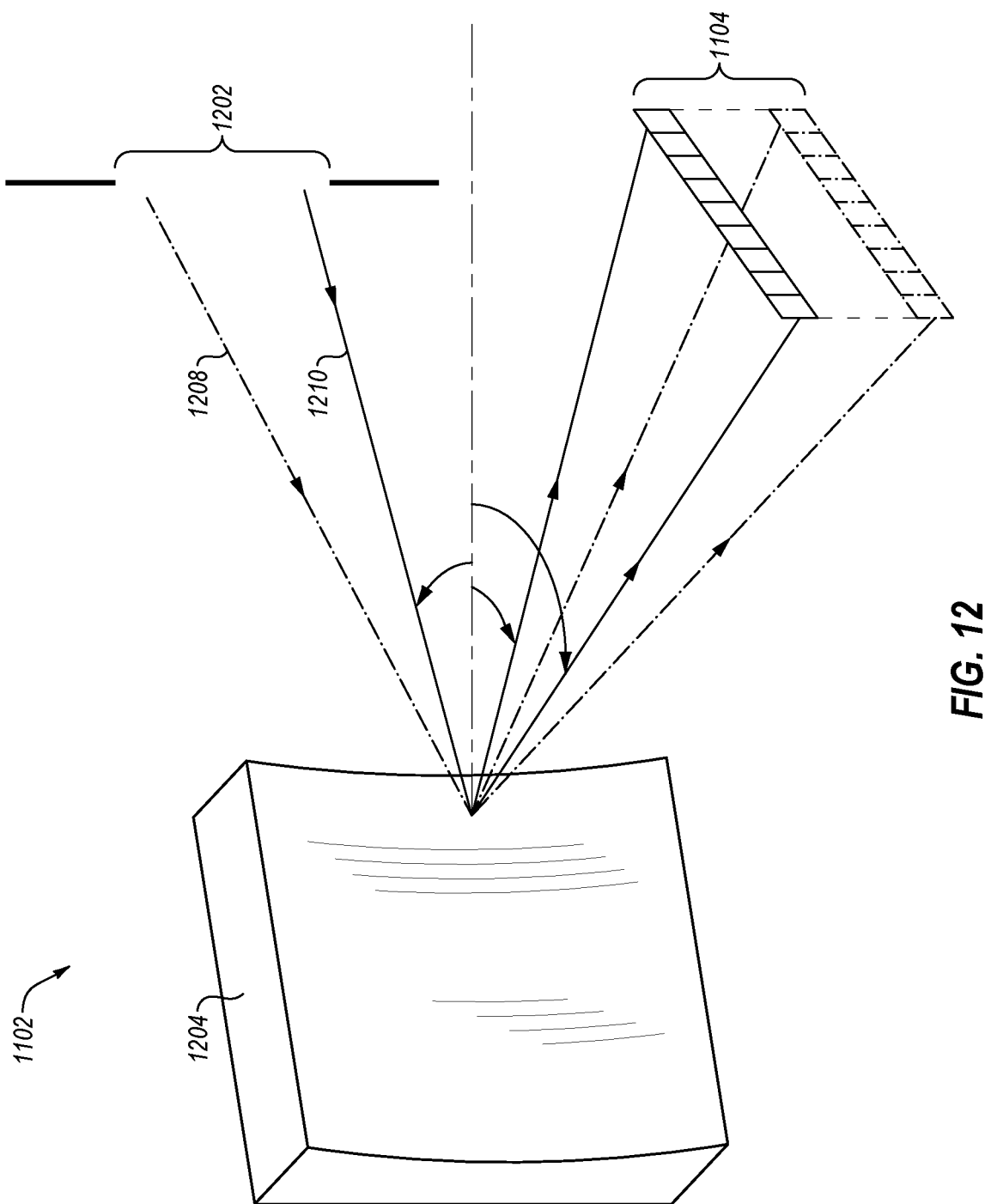
FIG. 12 illustrates operation of a spectrometer-detector combination as connected to the synchronized FD-OCT probes.

FIG. 12 illustrates operation of a spectrometer-detector combination as connected to the synchronized FD-OCT probes. The spectrometer 1102 as illustrated in FIG. 12 is a dispersive-element based spectrometer. As shown in the figure, the light 1208, 1210 arriving from the slab of material 102 is directed to a same entrance slit 1202 of the dispersive spectrometer 1102 and accordingly positioned in separate locations along the entrance slit 1202, or in other words at different locations within an object-plane of spectrometer 1102. Upon having undergone diffraction from a dispersive element i.e. grating 1204 of the spectrometer 1102, a plurality of dispersed images of the slit 1202 are projected on the two-dimensional array detector 1104.

The light entering through the different points on the same slit 1202 form spectral lines across the detector 1104, such that each row (i.e. a uni-dimensional array) of light sensitive elements corresponds to a particular spectral line or spectrum out of the plurality of spectrums captured by the detector 1102. More specifically, each light originating from the slab of material 102 undergoes dispersion to produce a plurality of diffracted wavelengths that interfere with one another to produce a corresponding interferogram with respect to a particular light. Overall, a plurality of interferograms are captured as a plurality of spectral lines through the array detector 1102. The voltage signal corresponding to various spectral lines (i.e. each row of the array-detector) is multiplexed and thereafter digitized for serial-transmission through a cable to computer 124 (i.e. spectral analysis module) that further analyzes spectra in accordance with the 'procedure' as described within the description of FIG. 1. Accordingly, each spectral-line corresponding to each light received from probe 602 (1 to n) is analyzed separately through spectral analysis module.

Figure 13:
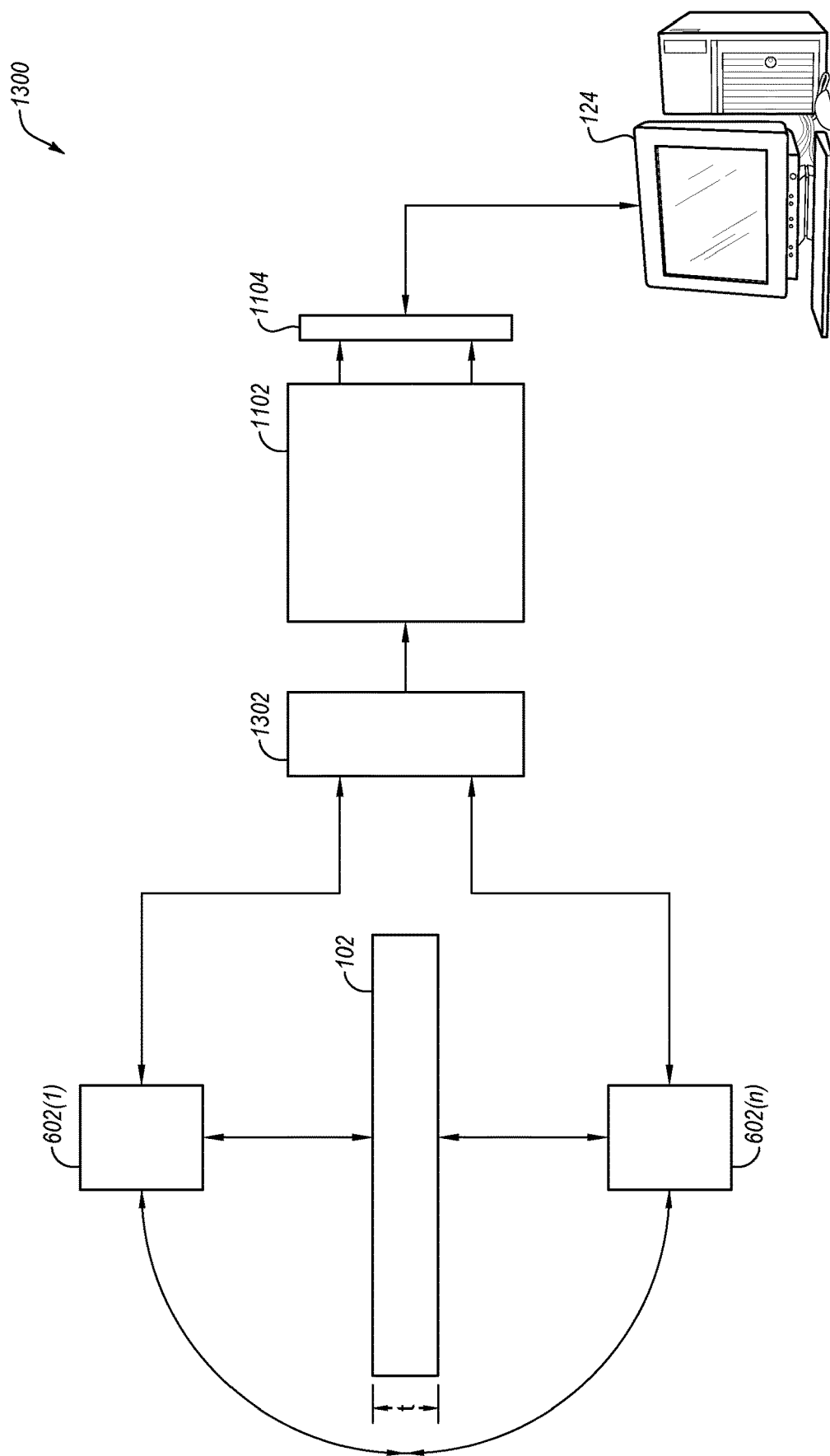
FIG. 13 illustrates synchronized FD-OCT probes utilizing a spectrometer-detector combination through an optical-switch for measurement of properties of the slab of material.

FIG. 13 illustrates synchronized FD-OCT probes utilizing a spectrometer-detector combination through an optical-switch for measurement of properties of the slab of material. A system 1300 as shown in FIG. 13 comprises synchronized FD-OCT probes utilizing the centralized spectrometer and detector combination (as depicted through FIG. 11) through an optical-switch 1302 for measurement of thickness and topography of the slab of material. More specifically, each of the plurality of probes 602 (1 to n) are ported to the centralized spectrometer 1102 through an optical-switch 1304. In addition, said optical switch 1304 may be also appropriated to link a single broadband light source to the multiple probes 602 (1 to n) for the purposes of irradiating the slab of material 102. In an example, the optical switch may correspond to either 1×N or N×1 configuration and may exemplarily be mechanical switch or Micro-electromechanical System (MEMS) switch.

Figure 14:
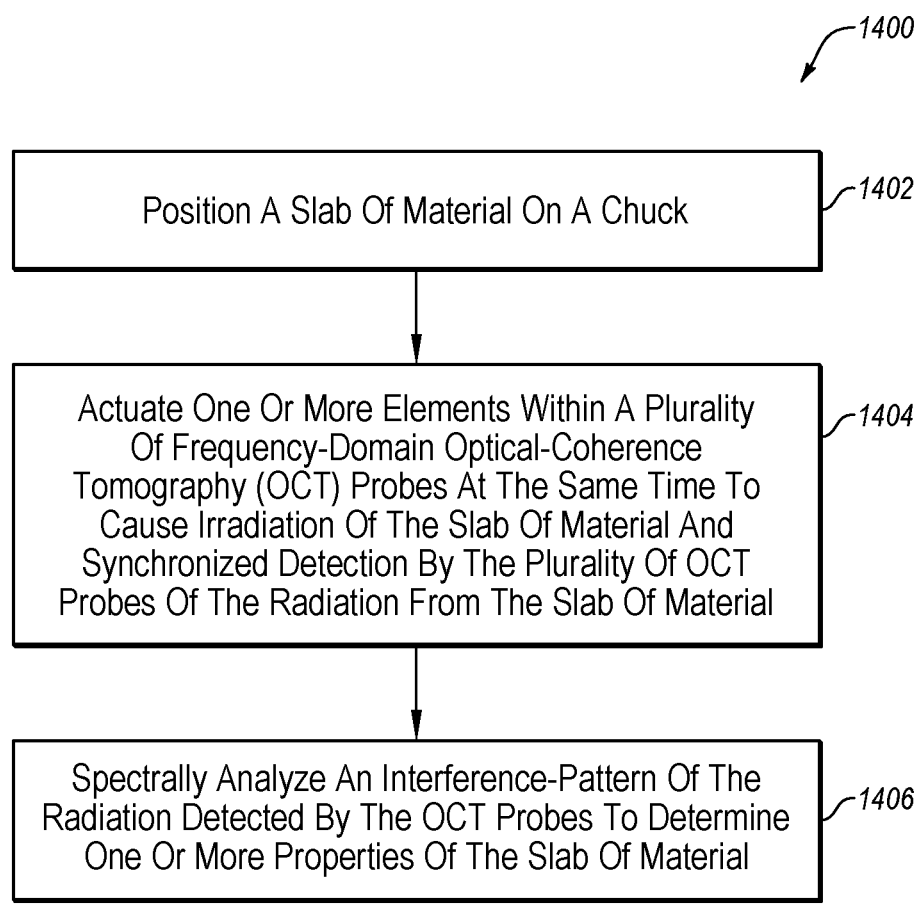
FIG. 14 illustrates a flowchart of an example method of measurement of properties of the slab of material through synchronized FD-OCT probes.

FIG. 14 illustrates a flowchart of an example-method of measurement of properties (e.g. thickness and topography) of a slab of material through multiple FD-OCT probes 602 (1 to n).

At step 1402, the slab of material 102 to be measured in placed within a chuck for initiating the measurement.

At step 1404, one or more elements within a plurality of FD-OCT probes 602 (1 to n) are actuated at the same time by the centralized actuating mechanism 611 to cause an operation thereof. Such operation of the plurality of probes 602 is achieved due to simultaneous actuation of each of the probe 602 by the actuation mechanism as described with respect to FIG. 6 to FIG. 11 and comprises:

a) irradiating the slab of material at-least one location by said plurality of probes 602; and b) synchronously detecting by the plurality of probes 602 the radiation reflected from the slab of material or transmitted there-through.

The synchronized-operation of the probes 602 in step 1404 further comprises filtering the detected radiation through an etalon-filter 120, 220, 320 present within each of the FD-OCT probe 602 to cause generation of the interference pattern with respect to each FD-OCT probe 602. An individual operation of each of the FD-OCT probe 602 corresponds to the method-steps as described with respect to the FIG. 10 of the aforesaid U.S. patent application Ser. No. 15/410,328. Further, the radiation or light outputted from each of the FD-OCT probe 602 is dispersed by a dispersive element (e.g. grating) within the spectrometer 122, 1102 to thereby generate a plurality of spectrums. Each of the plurality of spectrums detected through the 2-dimensional array-detector 1104 thereafter undergo a spectral-analysis through the next step 1406. In order to facilitate such spectral-analysis, a plurality of signals (e.g. voltage) corresponding to the detected-spectrums and generated at the detector are multiplexed and thereafter digitized for transmission to the computer 124. The digitized-signal received at the computer 124 thereafter undergoes a digital to analog conversion through a digital-to-analog converter and de-multiplexing to recreate a plurality of analog signals at the computer 124 for the purposes of spectral-analysis.

At step 1406, the analog-signal(s) recreated at the computer 124 from the previous step 1404 are spectrally-analyzed (in accordance with the procedure as described with respect to FIG. 1). Accordingly, the present step denotes a spectral-analysis of the interference pattern or spectrum corresponding to each of the probes. The spectral analysis in turn leads to a determination of properties of the slab of material such as a) thickness with respect to one or more locations at the slab of material; and b) topography of the slab of material.

Figure 15A:
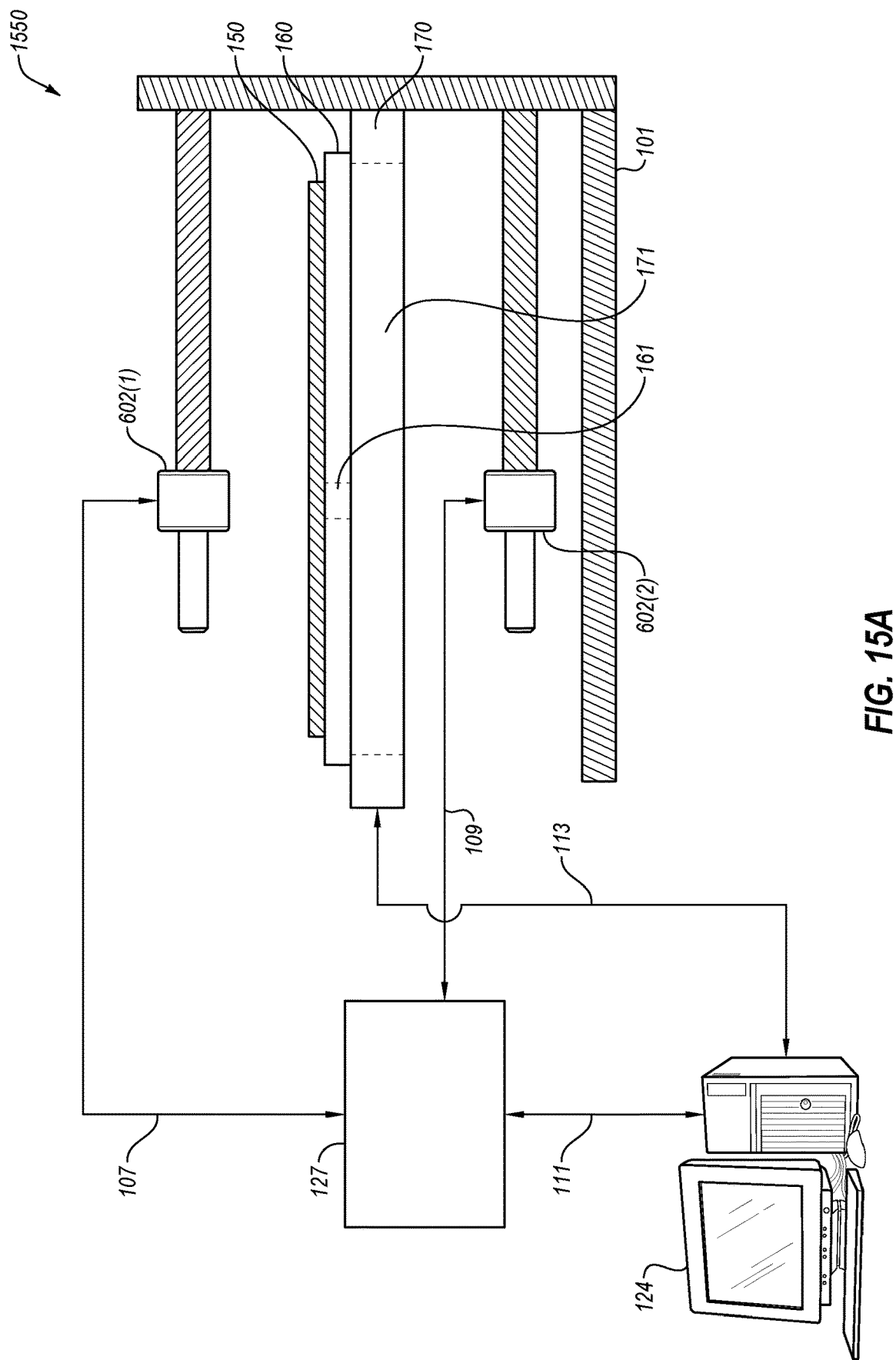
FIG. 15A illustrates an arrangement of two FD-OCT probes for measurement of a slab of material.

FIG. 15A illustrates an arrangement of two FD-OCT probes 602 for measurement of a slab of material 150 according to at least one embodiment described in the present disclosure. In general, the probes 602 irradiate the top and bottom of the slab of material 150, receive radiation reflected by or transmitted through the slab of material 150, and spectrally analyze the received radiation to determine properties of the slab of material 150. The slab of material 150 may be similar to or be an example of the slab of material 102 of FIGS. 1-4, 5-11, and 13. Additionally, the slab of material 150 may include multiple layers, for example, a passivation layer, a metallic layer, and a silicon layer.

In some embodiments, the system 1550 may include a stand 101 configured to support the probes 602. In some embodiments, the system 1550 may include two or more probes 602. The probes may be the same as, or substantially similar to the probes 602 described above with regard to FIGS. 7-13.

In some embodiments the system 1550 may include an XY motion stage 170. The stand 101 may be configured to support the XY motion stage 170. The XY motion stage 170 may be configured to move the slab of material 150 relative to the probes 602 such that different portions of the slab of material 150 may be irradiated and measured by the probes 602 at different times. The XY motion stage 170 may include a cutout 171 through which radiation may pass. The cutout 171 may be a void in the XY motion stage 170. Additionally or alternatively, the cutout 171 may include a material that has a relatively small or well-known impact on radiation passing through the cutout 171.

In some embodiments, the system 1550 may include a wafer chuck 160. The wafer chuck 160 may be configured to retain the slab of material 150 in position relative to the XY motion stage 170. The wafer chuck 160 may include a cutout 161. The cutout 161 may be a void in the wafer chuck 160. Additionally or alternatively, the cutout 161 may include a material that has a relatively small or well-known impact on radiation passing through the cutout 161. The wafer chuck 160 may include grooves configured to hold the slab of material 150. For example, the wafer chuck 160 may include grooves that may be retained at a low air pressure relative to the surrounding air such that a suction force retains the slab of material 150 on the wafer chuck 160.

In some embodiments, the system 1550 may include an optical metrology unit 127. The optical metrology unit 127 may be configured to analyze signals or light received by the probes 602. The optical metrology unit 127 may be configured to perform spectral analysis of the radiation received by the probes 602. The optical metrology unit 127 may be configured to determine one or more properties of the slab of material 150, for example, thickness and/or topology. The optical metrology unit 127 may include one or more of spectrometers, etalons and/or light sources.

In these or other embodiments, the slab of material 150 may include a computer 124 that may be configured to analyze signals received by the probes 602. The computer 124 may be configured to perform spectral analysis of the radiation received by the probes 602. The computer 124 may be configured to determine one or more properties of the slab of material 150, for example, thickness and/or topology. Additionally or alternatively the computer 124 may be configured to control the XY motion stage 170 and/or the probes 602. For example the system 1550 may be configured to calculate a distance from the probe 602 to a surface of the slab of material 150 and/or the thickness of the slab of material 150, including the thickness of one or more layers of the slab of material 150, at a first location. Then, the system 1550 may be configured to move the slab of material 150 to a second location and calculate a distance from the probe 602 to a surface of the slab of material 150 and/or the thickness of the slab of material, including the thickness of one or more layers of the slab of material, at the second location. The system 1550 may be configured to scan multiple locations of the slab of material 150 and generate a topography of the slab of material or a map of the thickness of the slab of material, including the thickness of one or more layers of the slab of material.

The top probe 602(1) may be connected to the optical metrology unit 127 through a single-mode optical fiber 107. The bottom probe 602(2) may be connected to the optical metrology unit 127 through a single-mode optical fiber 109. The optical metrology unit 127 may be connected to the computer 124 through an electrical cable 111. And, the computer 124 may be connected to the XY motion stage 170 through an electrical cable 113.

Modifications, additions, or omissions may be made to the system 1550 without departing from the scope of the present disclosure. For example the system 1550 may include any number of .probes 602. As another example, the optical metrology unit 127 may be included in or part of the computer 124.

Figure 15B:
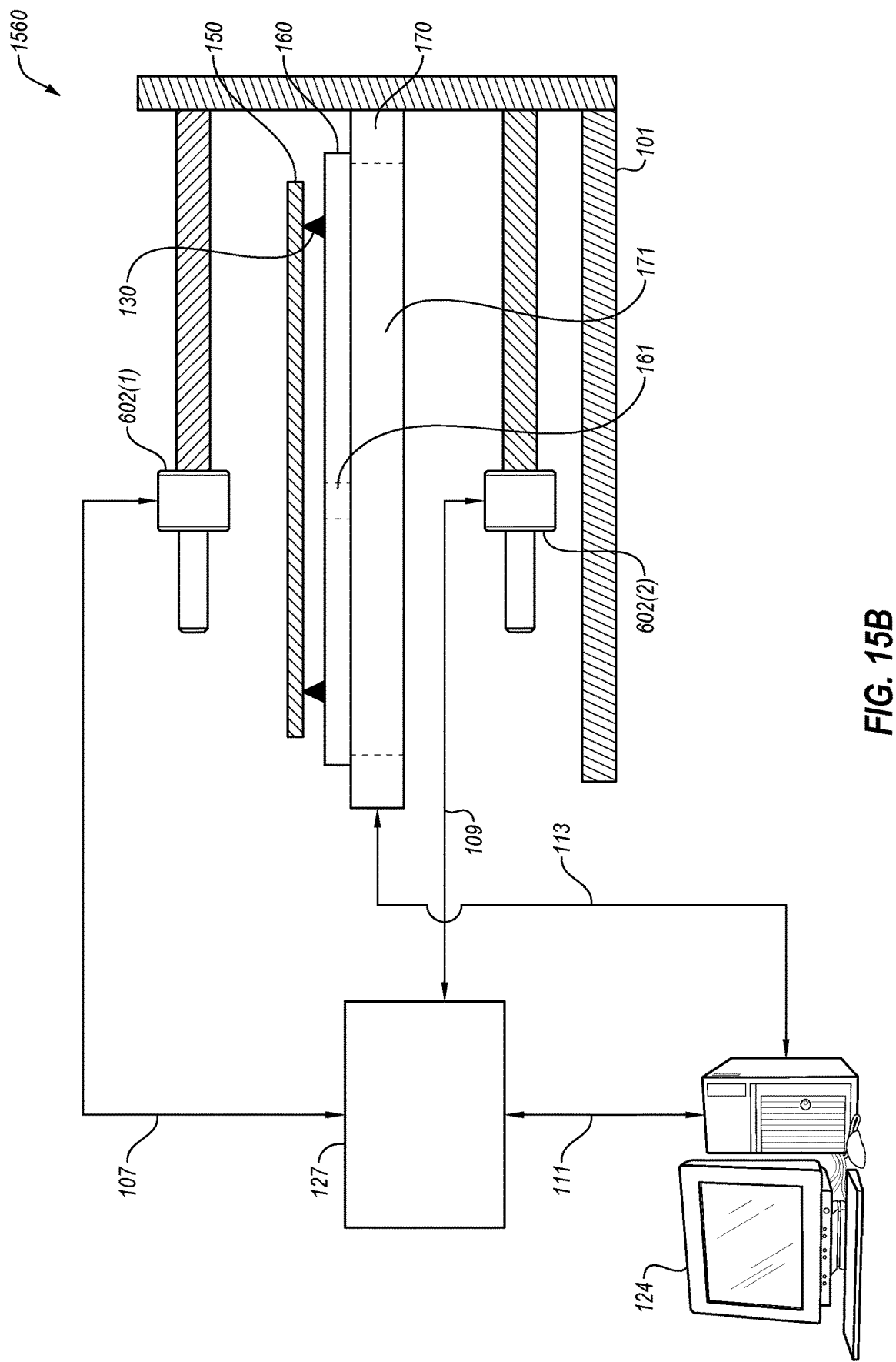
FIG. 15B illustrates another arrangement of two FD-OCT probes for measurement of a slab of material.

FIG. 15B illustrates another arrangement of two FU-OCT probes 602 for measurement of a slab of material 150 according to at least one embodiment described in the present disclosure. The system 1560 of FIG. 15B may be the same as or substantially similar to the system 1550 of FIG. 15A with the exception of pins 130.

In some embodiments, the system 1560 may include the pins 130. The pins 130 include three or more pins configured to position the slab of material 150 relative to the wafer chuck 160. The pins 130 may be attached to or part of the wafer chuck 160. The pins 130 may retain the slab of material 150 relative to the wafer chuck 160 as the XY motion stage 170 moves the wafer chuck 160. Additionally or alternatively, the pins 130 may retain the slab of material 150 relative to the wafer chuck 160 even if the stand 101 is moved, shaken and/or vibrated. The pins 130 may be useful in measuring a bow or warp of the slab of material 150.

Modifications, additions, or omissions may be made to the system 1560 without departing from the scope of the present disclosure. For example the system 1560 may include any number of .probes 602 and/or pins 130.

Figure 16A:
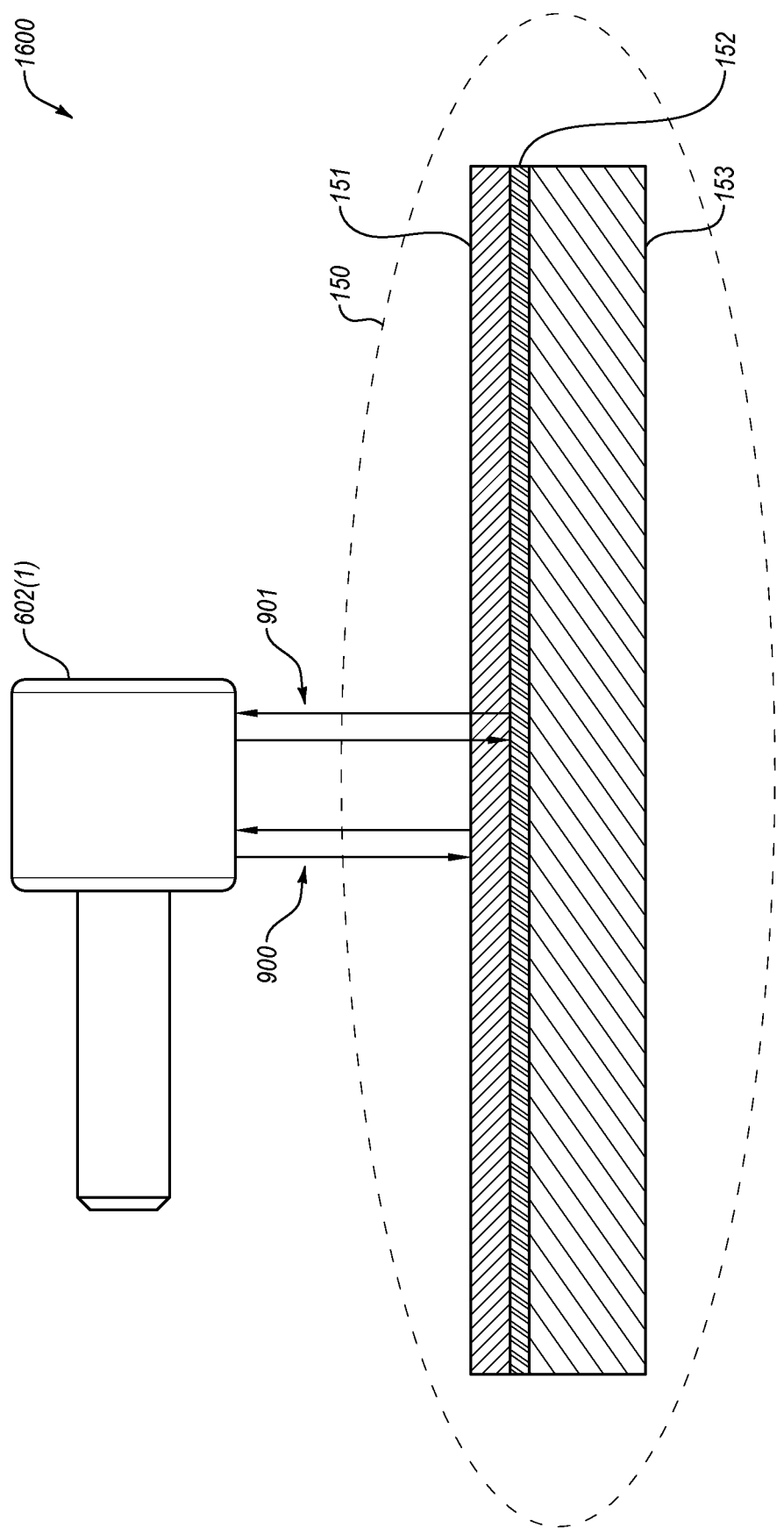
FIG. 16A illustrates an arrangement an FD-OCT probe for measurement of a slab of material that includes multiple layers.

FIG. 16A illustrates an arrangement an FD-OCT probe 602(1) for measurement of a slab of material 150 that includes multiple layers according to at least one embodiment described in the present disclosure. The probe 602(1) may be the same as or substantially similar to the probes 602 described above with regard to FIGS. 7-13 and 15. In general, the probe 602(1) may irradiate the slab of material 150 with ray 900 and ray 901, the ray 900 and the ray 901 may be reflected off the slab of material 150, and the ray 900 and the ray 901 may be received by the probe 602(1). In some embodiments, the 602(1) may send a signal representing the received ray 900 and the received ray 901 and/or the ray 900 and the ray 901 to an optical metrology unit, for example, the optical metrology unit 127 and/or computer 124 of FIG. 15A, for analysis and determination of properties of the slab of material 150.

In some embodiments, the slab of material 150 may include multiple layers. For example, the slab of material 150 may include a passivation layer 151 made up of any suitable material, for example a synthetic polymer, for example, polymide. In some embodiments, the slab of material 150 may include a metallic layer 152, for example, a metalized pattern layer. The metallic layer 152 may be made up of any suitable metal, for example, copper. In some embodiments, the slab of material 150 ay include a silicon layer 153. The silicon layer 153 may be made up of silicon or silicon dioxide.

In some embodiments, semiconductor wafers are covered with a passivation layer. Typical thicknesses of polymide passivation layers range from five micrometers (μm) to twenty μm. In some embodiments, passivation layers are thinned. In some embodiments, passivation layers have a total thickness variation on the order of one μm to five μm.

In some embodiments, the probe 602(1) may irradiate the slab of material 150 with the ray 900 and the ray 901. There may be no difference between the ray 900 and the ray 901 as the rays 900 and 901 leave the probe 602(1). The ray 900 may be reflected by the air-passivation layer interface. The ray 901 may be reflected by the passivation layer-metal interface. The ray 900 and the ray 901 may have different properties when they are received by the probe 602(1). For example, spectral analysis of the 900 and the 901 may reveal a difference in the distances traveled by the ray 900 and the ray 901 through an interferometric analysis. Differences between the ray 900 and the ray 901 may include such things as a difference in wavelength, a difference in energy for example, due to diffraction, and/or a delay due to a travel time. For example, the ray 900 and the ray 901 may be indistinguishable when transmitted, and they may be transmitted together. The ray 900 and the ray 901 may be separately reflected with ray 900 being reflected by the air-passivation-layer interface and the ray 901 passing through the passivation layer to be reflected by the passivation-layer-metallic-layer interface.

In some embodiments, based on the differences between the ray 900 and the ray 901, it may be possible to determine the thickness of the passivation layer 151. For example, the probe 602(1) may send signals regarding the ray 900 and the ray 901 to the optical metrology unit 127 which may determine the thickness of the passivation layer 151. Additionally or alternatively, the probe 602(1) may transmit the ray 900 and the ray 901 to the optical metrology unit 127, for example, via a single-mode optical fiber 107. The optical metrology unit 127 may perform the interferometric analysis and determine the distances traveled by the ray 900 and the ray 901 and the differences between the distances traveled by the ray 900 and the ray 901.

Modifications, additions, or omissions may be made to the system 1600 without departing from the scope of the present disclosure. For example the wafer 150 may include any number of layers which may reflect any number of corresponding rays.

Figure 16B:
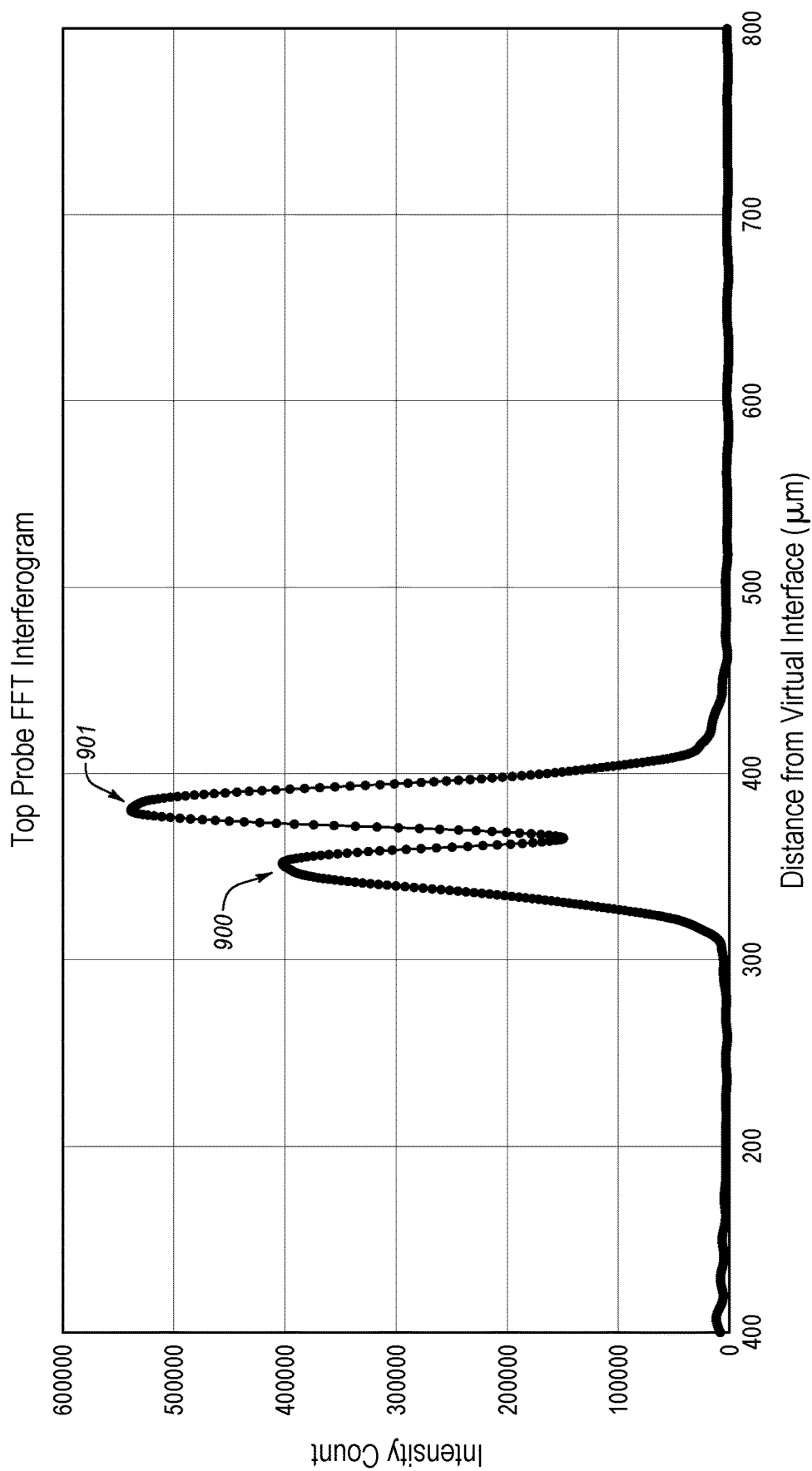
FIG. 16B illustrates a simulated measurement of a slab of material that includes multiple layers as obtained by an FD-OCT probe.

FIG. 16B illustrates a simulated measurement of a slab of material that includes multiple layers as obtained by an FD-OCT probe according to at least one embodiment described in the present disclosure. For example, FIG. 16B may include inteferogram results based on radiation received by a probe, for example, probe 602(1) of FIG. 16A in response to irradiating a slab of material 150 with a ray 900 and a ray 901. In FIG. 16B, 900 may indicate a first distance, for example a distance traveled by ray 900 as determined by an interferometric analysis. In FIG. 16B, 901 may indicate a second distance, for example a distance traveled by ray 901 as determined by an interferometric analysis. By observing the difference between the two distances 900 and 901, it may be possible to determine a thickness of the passivation layer 151.

Figure 17A:
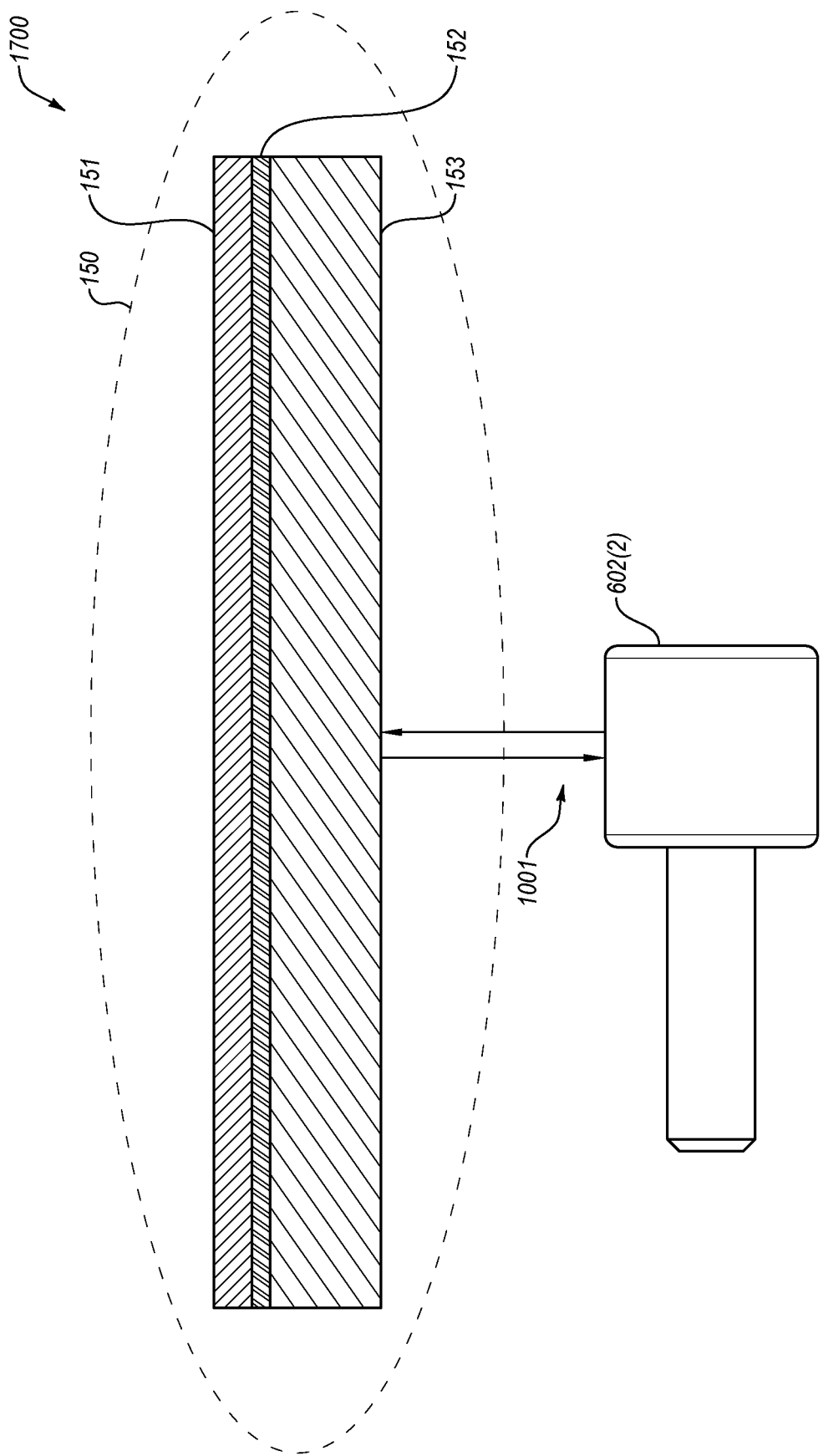
FIG. 17A illustrates an arrangement an FD-OCT probe for measurement of a slab of material that includes multiple layers.

FIG. 17A illustrates an arrangement an FD-OCT probe for measurement of a slab of material that includes multiple layers according to at least one embodiment described in the present disclosure. The probes 602(2) may be the same as or substantially similar to the probes 602 described above with regard to FIGS. 7-13 and 15-16.1n general, the probe 602(2) may irradiate the slab of material 150 with ray 1001, the ray 1001 may be reflected off the slab of material 150, and the ray 1001 may be received by the probe 602(2). In some embodiments, the probe 602(2) may send a signal representing the received ray 1001 to an optical metrology unit 127 and/or computer 124 for analysis and determination of properties of the slab of material 150. Additionally or alternatively, the probe 602(2) may transmit the ray 900 and the ray 901 to the optical metrology unit 127, for example, via a single-mode optical fiber 109. The optical metrology unit 127 may perform the interferometric analysis and determine the distances traveled by the ray 900 and the ray 901 and the differences between the distances traveled.

In some embodiments, the slab of material 150 may be the same as or substantially similar to the slab of material 150 of FIG. 16A.

In some embodiments, the probe 602(2) may irradiate the slab of material 150 with the ray 1001. The ray 1001 may be reflected by the air-silicon interface. The ray 1001 may be spectrally analyzed to reveal a distance traveled by the ray 1001 through an interferometric analysis. In some embodiments, substantially all, or most of the radiation reflected may have the same distance traveled. This may indicate that only one surface reflected radiation.

Modifications, additions, or omissions may be made to the system 1700 without departing from the scope of the present disclosure. For example the wafer 150 may include any number of layers.

Figure 17B:
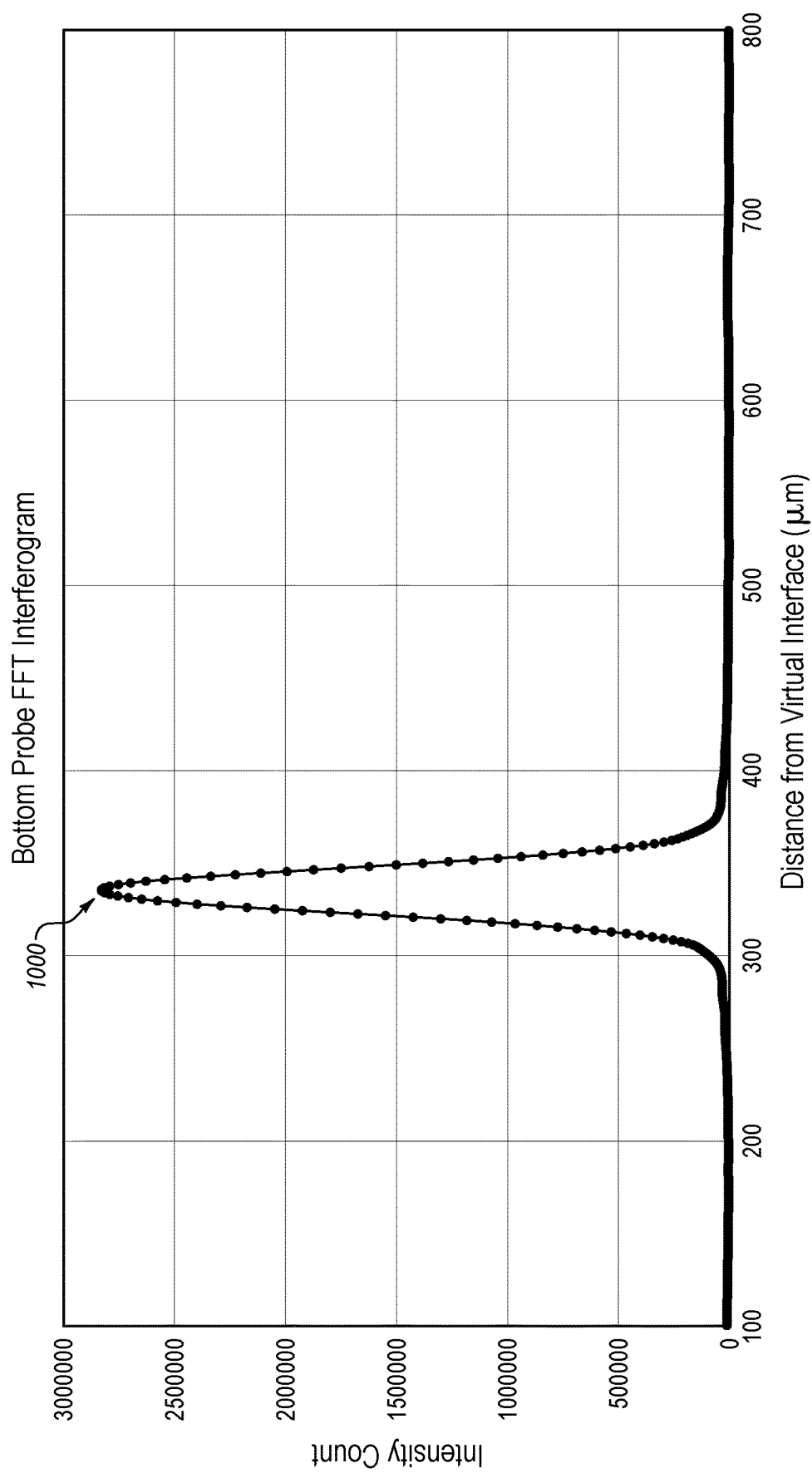
FIG. 17B illustrates a simulated measurement of a slab of material that includes multiple layers as obtained by an FD-OCT probe.

FIG. 17B illustrates a simulated measurement of a slab of material that includes multiple layers as obtained by an FD-OCT probe according to at least one embodiment described in the present disclosure. For example, FIG. 17B may include inteferogram results based on radiation received by a probe, for example, probe 602(2) of FIG. 17A in response to irradiating a slab of material 150 with a ray 1001. In FIG. 17B, 1000 may indicate a distance, for example a distance traveled by ray 1001 as determined by an interferometric analysis. By observing that there is only one peak in the interferogram, it may be possible to conclude that only one reflecting interface was reached by the radiation. This may be indicative of the absence of a passivation layer on this surface of the slab of material 150.

FIG. 1S. 18A-18B illustrate a flowchart of an example process 1800 of measuring a topography of a slab of material according to at least one embodiment described in the present disclosure. In some embodiments, one or more of the operations associated with the process 1800 may be performed by the systems 600-1100 and 1300 of FIGS. 6-11 and 13, the system 1550 of FIG. 15A, or the system 1560 of FIG. 15B. In some embodiments, one or more of the operations associated with the process 1800 may be performed by any suitable system, apparatus, or device. For example, the computer 124 of FIGS. 1-3 5-13, and 15A-B, the optical metrology unit 127 of FIGS. 15A and 15B, and/or the computing system 1500 of FIG. 22 may perform one or more of the operations associated with the process 1800. Although illustrated with discrete blocks, the steps and operations associated with one or more of the blocks of the process 1800 may be divided into additional blocks, combined into fewer blocks, or eliminated, depending on the desired implementation.

Figure 18A:
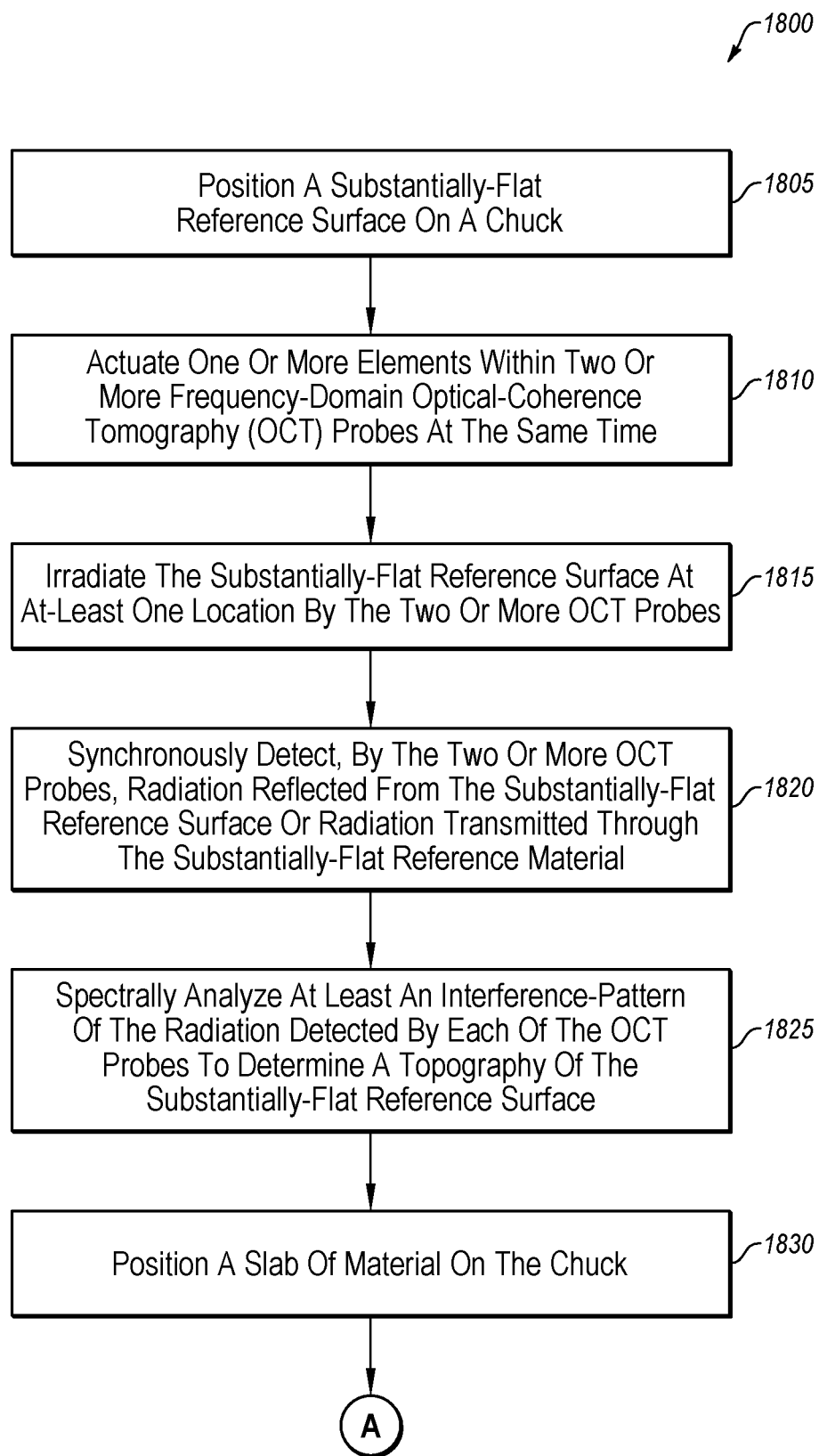
FIGS. 18A-18B illustrates a flowchart of an example process of measuring a topography of a slab of material.

With reference to FIG. 18A, at block 1805 a substantially-flat reference surface may be positioned on a chuck. For example, a mirror may be used as the substantially-flat reference surface. The wafer chuck 160 of FIG. 15A or 15B may be an example of the chuck of the block 1805.

At block 1810 one or more elements within two or more frequency-domain optical-coherence tomography (OCT) probes may be actuated. The actuation may occur at the same time. The probes 602 of the FIGS. 6-11, 13, 15A, and 15B may be examples of the OCT probes of the block 1810. In some embodiments, the actuation may cause the OCT probes to perform one or more operations, including operations associated with block 1815 and block 1820.

At the block 1815 the substantially-flat reference surface may be irradiated at at-least one location by the two or more OCT probes. Rays 900 and 901 of FIG. 16A may be examples of the irradiation of the block 1815. The probes 602 of the FIGS. 6-11, 13, 15A, and 15B may be examples of the OCT probes of the block 1815.

At the block 1820 radiation may be synchronously detected by the two or more OCT probes. The radiation may have been reflected from the substantially-flat reference surface or transmitted through the substantially-flat reference surface. The returning rays 900 and 901 of FIG. 16A may be examples of the radiation being synchronously detected at the block 1820. The probes 602 of the FIGS. 6-11, 13, 15A, and 15B may be examples of the OCT probes of the block 1820.

At block 1825 at least an interference-pattern of the radiation detected by each of the OCT probes may be spectrally analyzed to determine a topography of the substantially-flat reference surface. For example, after the radiation is detected by the OCT probes at the block 1820, a signal indicative of the detected radiation, or the detected radiation itself, may be transmitted to an optical metrology unit for analysis. For example, the probes 602 of the FIGS. 6-11, 13, 15A, and 15B may be examples of the OCT probes of the block 1825. After the probes receive the radiation, it may be transmitted over single-mode optical fibers, such as, for example, the single-mode optical fiber 107 and the single-mode optical fiber 109 of FIG. 15A to the optical metrology unit 127 of FIG. 15A. The optical metrology unit 127 of FIG. 15A may perform the spectral analysis of the block 1825.

In some embodiments, the substantially-flat reference surface may be moved relative to the OCT probes such that multiple locations of the substantially flat reference surface may be irradiated and the reflections therefrom may be spectrally analyzed. For example, the XY motion stage 170 of FIG. 15A may be used to move the wafer chuck 160 relative to the probes 602. For example, the XY motion stage 170 may cause the scan multiple locations of the substantially-flat reference surface. Thus, the block 1825 may include determining a topography of multiple locations of the substantially-flat reference surface.

At block 1830 a slab of material may be positioned on the chuck. For example, the slab of material 150 of FIG. 15A or 15B may be the slab of material of the block 1830. The wafer chuck 160 of FIG. 15A or 15B may be an example of the chuck of the block 1830.

Figure 18B:
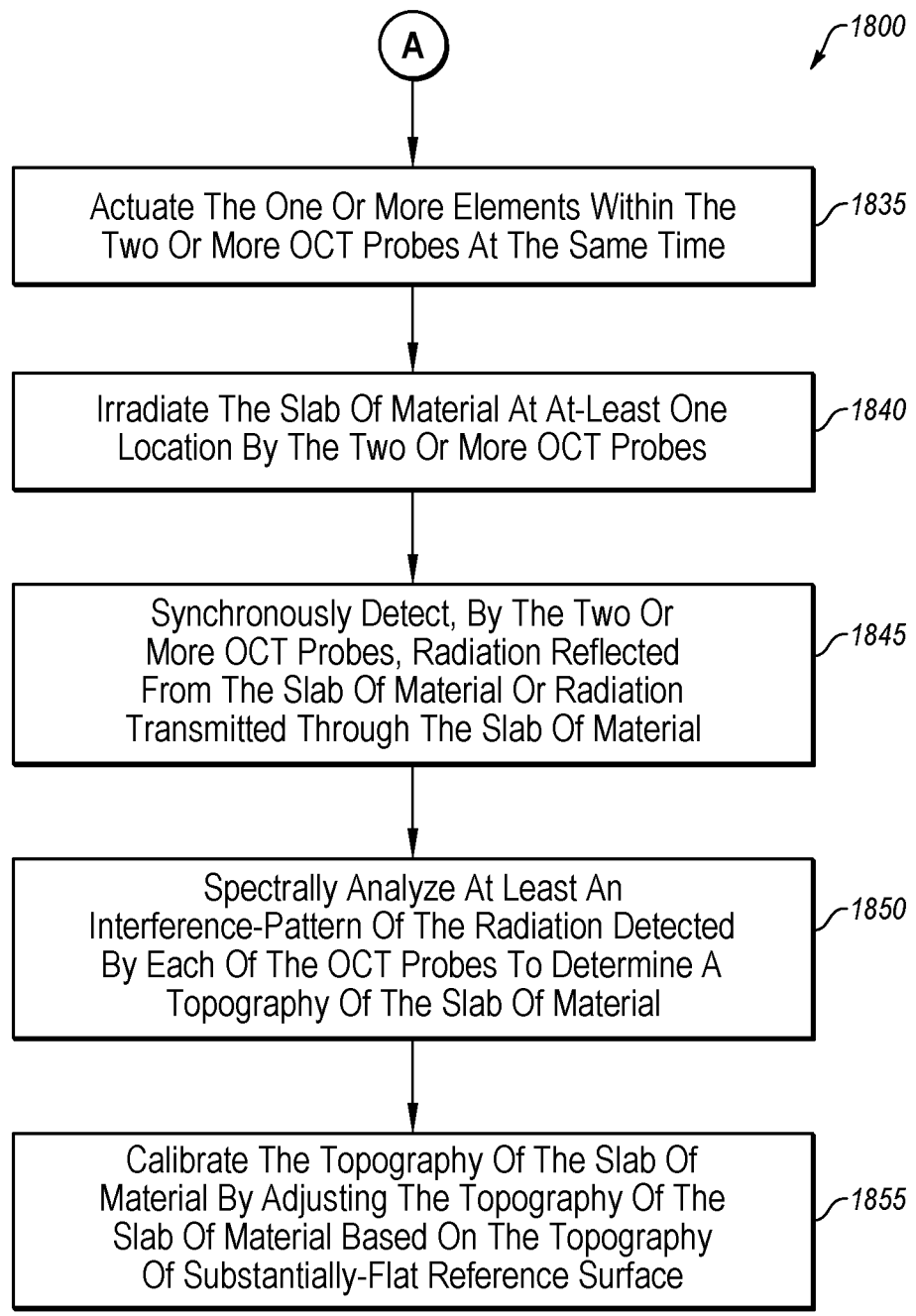

With reference to FIG. 18B, at block 1835 the one or more elements within the two or more OCT probes may be actuated. The actuation may occur at the same time. The probes 602 of the FIGS. 6-11, 13, 15A, and 15B may be examples of the OCT probes of the block 1835. In some embodiments, the actuation may cause the OCT probes to perform one or more operations, including operations associated with block 1840 and block 1845.

At the block 1840 the slab of material may be irradiated at at-least one location by the two or more OCT probes. Rays 900 and 901 of FIG. 16A may be examples of the irradiation of the block 1840. The probes 602 of the FIGS. 6-11, 13, 15A, and 15B may be examples of the OCT probes of the block 1840.

At the block 1845 radiation may be synchronously detected by the two or more OCT probes. The radiation may have been reflected from the slab of material or transmitted through the slab of material. The returning rays 900 and 901 of FIG. 16A may be examples of the radiation being synchronously detected at the block 1845. The probes 602 of the FIGS. 6-11, 13, 15A, and 15B may be examples of the OCT probes of the block 1845.

At block 1850 at least an interference-pattern of the radiation detected by each of the OCT probes may be spectrally analyzed to determine a topography of the slab of material. For example, after the radiation is detected by the OCT probes at the block 1845, a signal indicative of the detected radiation, or the detected radiation itself, may be transmitted to an optical metrology unit for analysis. For example, the probes 602 of the FIGS. 6-11, 13, 15A, and 15B may be examples of the OCT probes of the block 1850. After the probes receive the radiation, it may be transmitted over single-mode optical fibers, such as, for example, the single-mode optical fiber 107 and the single-mode optical fiber 109 of FIG. 15A to the optical metrology unit 127 of FIG. 15A. The optical metrology unit 127 of FIG. 15A may perform the spectral analysis of the block 1850.

In some embodiments, the slab of material may be moved relative to the OCT probes such that multiple locations of the slab of material may be irradiated and the reflections therefrom may be spectrally analyzed. For example, the XY motion stage 170 of FIG. 15A may be used to move the wafer chuck 160 relative to the probes 602. For example, the XY motion stage 170 may cause the scan multiple locations of the slab of material. Thus, the block 1850 may include determining a topography of multiple locations of the slab of material.

In some embodiments, the multiple locations of the slab of material that are irradiated may correspond to the multiple locations of the substantially-flat reference surface. For example, the XY motion stage 170 may be set to position the wafer chuck 160 in the same positions while each of the slab of material and the substantially-flat reference surface are irradiated and measurements are taken therefrom. Additionally or alternatively, the same scan pattern may be used to scan the slab of material as is used to scan the substantially-flat reference surface. For example, each of the slab of material and the substantially-flat reference surface may be scanned using the same raster pattern.

At block 1855 the topography of the slab of material may be calibrated by adjusting the topography of the slab of material based on the topography of substantially-flat reference surface. For example, the topography of the slab of material may include an indication of a height or thickness of the slab of material at multiple locations. Likewise, the topography of the substantially flat reference material may include an indication of a height or thickness of the substantially-flat reference surface at multiple locations. Additionally or alternatively, the topography of the substantially-flat reference surface may include variations in the measurements of the surface of the substantially-flat reference surface. The multiple locations of the topography of the slab of material may correspond to the multiple locations of the topography of the substantially flat reference surface. For example, with reference to the system 1550 of FIG. 15A, the topography of the substantially-flat reference surface may reveal irregularities in the stand 101, the wafer chuck 160, the XY motion stage 170, or other elements of the system 1550. The topography of the slab of material 150 may be corrected based on the topography of the substantially-flat reference surface. For example, the topography of the slab of material 150 may be normalized based on the topography of the substantially flat reference surface. For example, any irregularities in the topography of the substantially flat reference surface may be subtracted from, or added to, the topography of the slab of material 150.

Modifications, additions, or omissions may be made to the method 1800 without departing from the scope of the present disclosure. Further, the order of operations may vary according to different implementations. For example, the blocks 1830-1850 may occur first, followed by the blocks 1805-1825.

Figure 19:
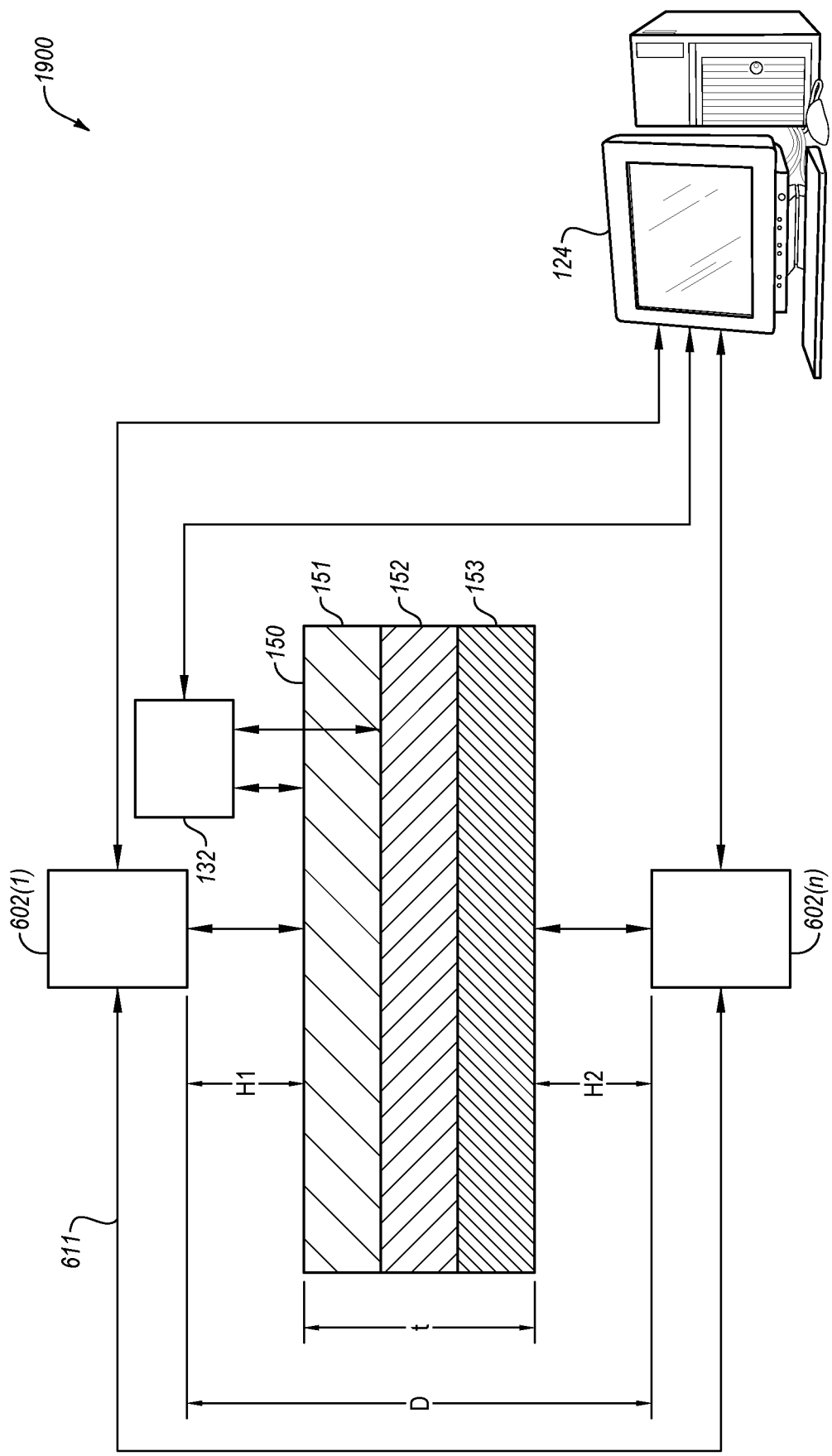
FIG. 19 illustrates an example system for inspecting a slab of material, including multiple frequency domain optical coherence tomography (FD-OCT) probes and a thin-film gauge.

FIG. 19 illustrates an example system 1900 for inspecting a slab of material 150, including multiple frequency domain optical coherence tomography (FD-OCT) probes 602 and a thin-film gauge 132 according to at least one embodiment described in the present disclosure. More specifically, FIG. 19 describes multiple probes 602(1) . . . 602(n) for acquiring data synchronously for measurement of thickness and topography of the slabs of material. The FD-OCT probes 602 (1) . . . 602(n) within the system 1900 correspond to the probes 602 of FIGS. 6-11, 13, 15A-16A, and 17A. Similarly, the slab of material 150, including passivation layer 151, metallic layer 152, and silicon layer 153, within the system 1900 corresponds to the slab of material 150 of FIGS. 15A-16A and 17A.

In some embodiments, the system 1900 includes a thin-film gauge 132, which may be configured to measure a thickness of one or more layers of the slab of material 150. For example, the thin-film gauge 132 may be configured to measure a thickness of the passivation layer 151. The thin-film gauge 132 may be configured to irradiate the slab of material 150 and detect radiation reflected from the slab of material 150. The thin-film gauge 132 may be configured to measure the thickness of the one or more layers of the slab of material 150 using, or in connection with the computing system 124. For example, the computing system 124 may perform one or more calculations with relation to measurements taken by, or detections of the thin-film gauge 132. In some embodiments, the thin-film gauge 132 may include a spectrometer 122. In these or other embodiments, the thin-film gauge 132 may be connected, to one of the spectrometers 122 of one of the probes 602. Any of these spectrometers 122 may perform one or more calculations with relation to the measurements taken by, or detections of the thin-film gauge 132.

In some embodiments, the thickness of a layer of the slab of material 150 may be determined by irradiating the slab of material 150 with radiation from the thin-film gauge 132 and detecting radiation reflected from the slab of material 150 at the thin-film gauge 132. The thin-film gauge 132 may irradiate the slab of material 150 with visible or ultraviolet radiation and detect reflected visible or ultraviolet radiation. Suitable wavelengths of irradiation include wavelengths from two hundred nanometers (nm) to eight hundred nm. The thin-film gauge 132, or one of the spectrometer 122 of one of the probes 602, may be configured to spectrally analyze radiation reflected by the slab of material 150 to determine a thickness of the one or more layers of the slab of material 150.

In some embodiments, a model of film on a slab of material 150 may be used when determining the thickness of the one or more layers of the slab of material 150. For example, the detected radiation may be compared to results of calculations made based on the model. For example, an exact stacked layer model of thin film residing on a metallic substrate may be used in determining the thickness of the one or more layers of the slab of material 150.

In some embodiments, in determining the thickness of the one or more layers of the slab of material 150, dispersion of the radiation may be analyzed and/or determined. For example, measured radiation may be compared with a dispersion model. For example, a complex refractive index of the material may be compared with measured reflected radiation. In determining the thickness of the one or more layers, a refractive index of 1.5 to 1.7 may be used.

In some embodiments, the thin-film gauge 132 may include any suitable device for measuring thickness of a material, such as, for example, an optical reflectometer, an optical ellipsometer, or a spectral ellipsometer. In some embodiments, the thin-film gauge 132 may be configured to measure radiation having a wavelength of two hundred nanometers or more. In some embodiments, the thin-film gauge 132 may be configured to irradiate the slab of material 150 with radiation that propagates collinearly with radiation emitted from the beam-forming assembly 118.

In some embodiments, the determined thickness of the slab of material 150 may be adjusted by the thickness of the one or more layers. For example, the determined thickness of the slab of material 150 may be adjusted by subtracting the thickness of a top layer of the slab of material 150. For example, a slab of material 150 may include a silicon substrate layer 153, a metallic layer 152, and a passivation layer 151. The thin-film gauge 132 may be used to determine the thickness of the passivation layer 151. The determined thickness of the slab of material 150 may be adjusted by subtracting off the thickness of the passivation layer 151.

In some embodiments the system 1900 may include an XY motion stage, a stand, a wafer chuck, and pins similar to or the same as what was illustrated in FIGS. 15A and 15B. As described above with regard to FIG. 15A, the system 1900 may be configured to calculated a topography and/or thickness map of the slab of material, including a thickness of one or more layers, at multiple locations.

Figure 20:
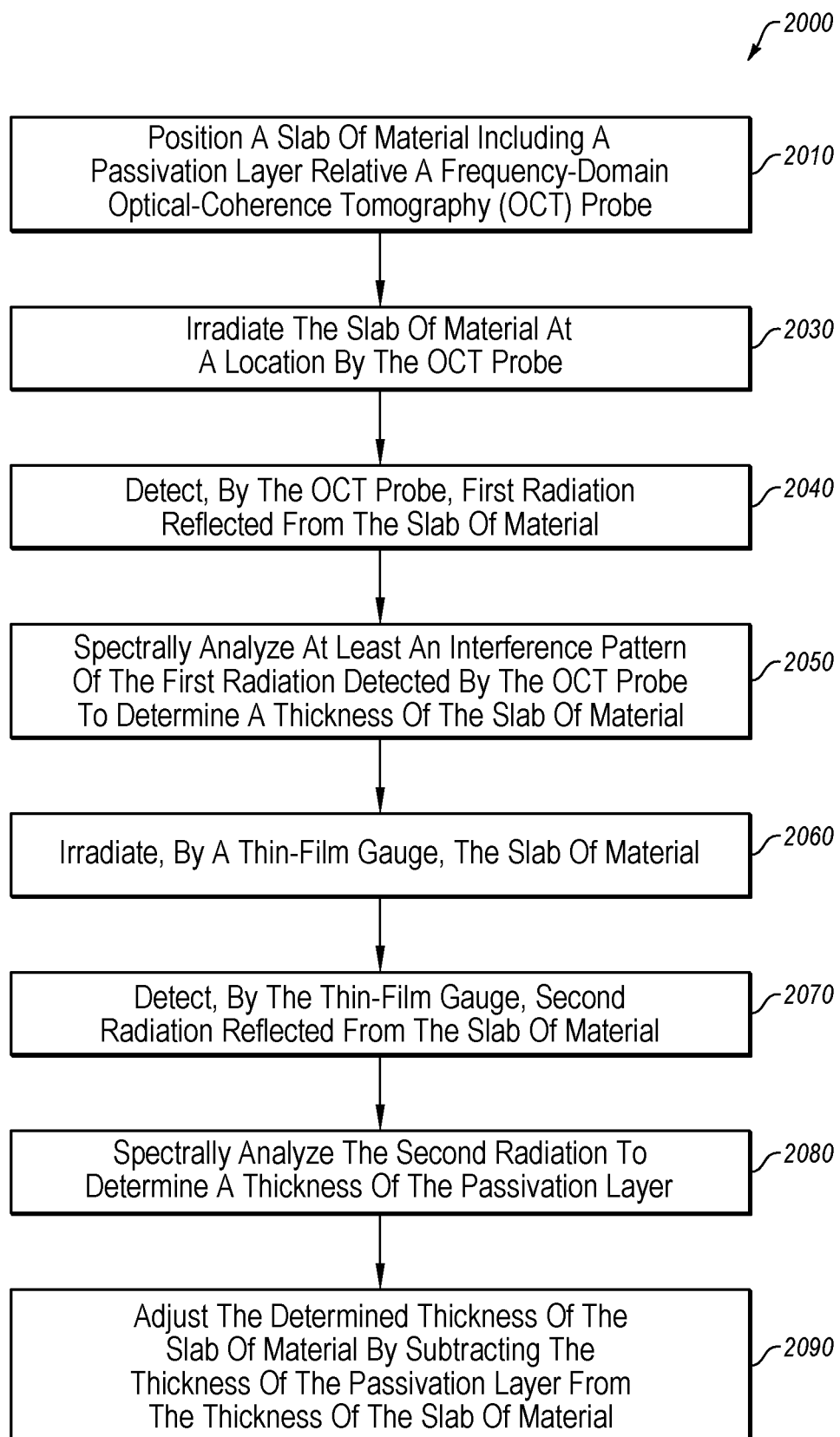
FIG. 20 illustrates a flowchart of an example process of measuring properties of a slab of material that includes multiple layers.

FIG. 20 illustrates a flowchart of an example process 2000 of measuring properties of a slab of material that includes multiple layers, according to at least one embodiment described in this disclosure. In some embodiments, one or more of the operations associated with the method 2000 may be performed by the system 1900 of FIG. 19. Blocks of the method 2000 may be performed by any suitable system, apparatus, or device. For example, the computing system 1500 of FIG. 22 may perform one or more of the operations associated with the method 2000. Although illustrated with discrete blocks, the steps and operations associated with one or more of the blocks of the method 2000 may be divided into additional blocks, combined into fewer blocks, or eliminated, depending on the desired implementation.

At block 2010, a slab of material including a passivation layer may be positioned relative to a frequency-domain optical-coherence tomography (OCT) probe. For example, the slab of material 150 of FIG. 19 may be positioned relative to one or more of the probes 602 of FIG. 19. The slab of material may be positioned a known distance from the probes. For example, the back surface of the slab of material 150 may be positioned a known distance from the probe 602(1).

At block 2030, the slab of material may be irradiated by the OCT probe at a location. For example, the probe 602(1) of FIG. 19 may irradiate the slab of material 150 of FIG. 19.

At block 2040 first radiation reflected from the slab of material may be detect by the OCT probe. For example, the probe 602(1) of FIG. 19 may detect radiation reflected from the slab of material 150. The first radiation may be reflected from one or more surfaces of the slab of material 150. For example, the slab of material 150 may include multiple layers, including a passivation layer, a metallic layer, and a silicon layer. The first radiation may include radiation reflected from an air-passivation-layer interface. The first radiation may also include radiation reflected from the passivation-layer-metallic-layer interface.

At block 2050, at least an interference pattern of the first radiation detected by the OCT probe may be analyzed to determine a thickness of the slab of material. For example a spectrometer and/or interferometer may be used to determine a change in the first radiation detected at block 2040 from the radiation transmitted at the block 2030. The determined thickness may correspond to one or more layers of the slab of material. For example, the determined thickness may correspond to all of the layers passivation layer 151, metallic layer 152, and silicon layer 153 together.

At block 2060, the slab of material may be irradiated by a thin-film gauge. For example, the thin-film gauge 132 of FIG. 19 may irradiate the slab of material 150 of FIG. 19. The slab of material may be irradiated with visible or ultraviolet light. The wavelength of the radiation used to irradiate the slab of material may be based on a type of material that is assumed to be in the top layer of the slab of material.

At block 2070, second radiation reflected from the slab of material may be detected by the thin-film gauge. For example, the thin-film gauge 132 of FIG. 19 may detect radiation reflected from the slab of material 150 of FIG. 19. The second radiation may be reflected from one or more surfaces of the slab of material. For example, the slab of material may include multiple layers, including a passivation layer, a metallic layer, and a silicon layer. The second radiation may include radiation reflected from an air-passivation-layer interface. The second radiation may also include radiation reflected from the passivation-layer-metallic-layer interface.

At block 2080, the second radiation may be spectrally analyzed to determine a thickness of the passivation layer. For example, the thin-film gauge 132 of FIG. 19 may analyze the radiation detected at block 2070 and determine a thickness of the passivation layer 151 of FIG. 19. For example a spectrometer may be used to determine a change in the second radiation detected at block 2070 from the radiation transmitted at the block 2060. As discussed above, the second radiation may include radiation reflected from more than one layer of the slab of material. Differences in the reflections from the different layers may be used to determine the thickness of one or more of the layers. For example, different wavelengths of radiation may have a peak in energy reflectance.

At block 2090, the determined thickness of the slab of material may be adjusted by subtracting the thickness of the passivation layer from the thickness of the slab of material. For example, the thickness determined at block 2050 may include the passivation layer 151, the metallic layer 152, and the silicon layer 153. At block 2090, the thickness of the passivation layer 151, as determined at block 2080, may be subtracted from the thickness determined at the block 2050 resulting in a determination of the thickness of the metallic layer 152 and the silicon layer 153 without the passivation layer 151.

Modifications, additions, or omissions may be made to the method 2000 without departing from the scope of the present disclosure. For example, in some embodiments, the blocks 2060, 2070, and 2080 may occur before, or at the same time as the blocks 2030, 2040, and 2050. Further, the order of operations may vary according to different implementations.

Figure 21:
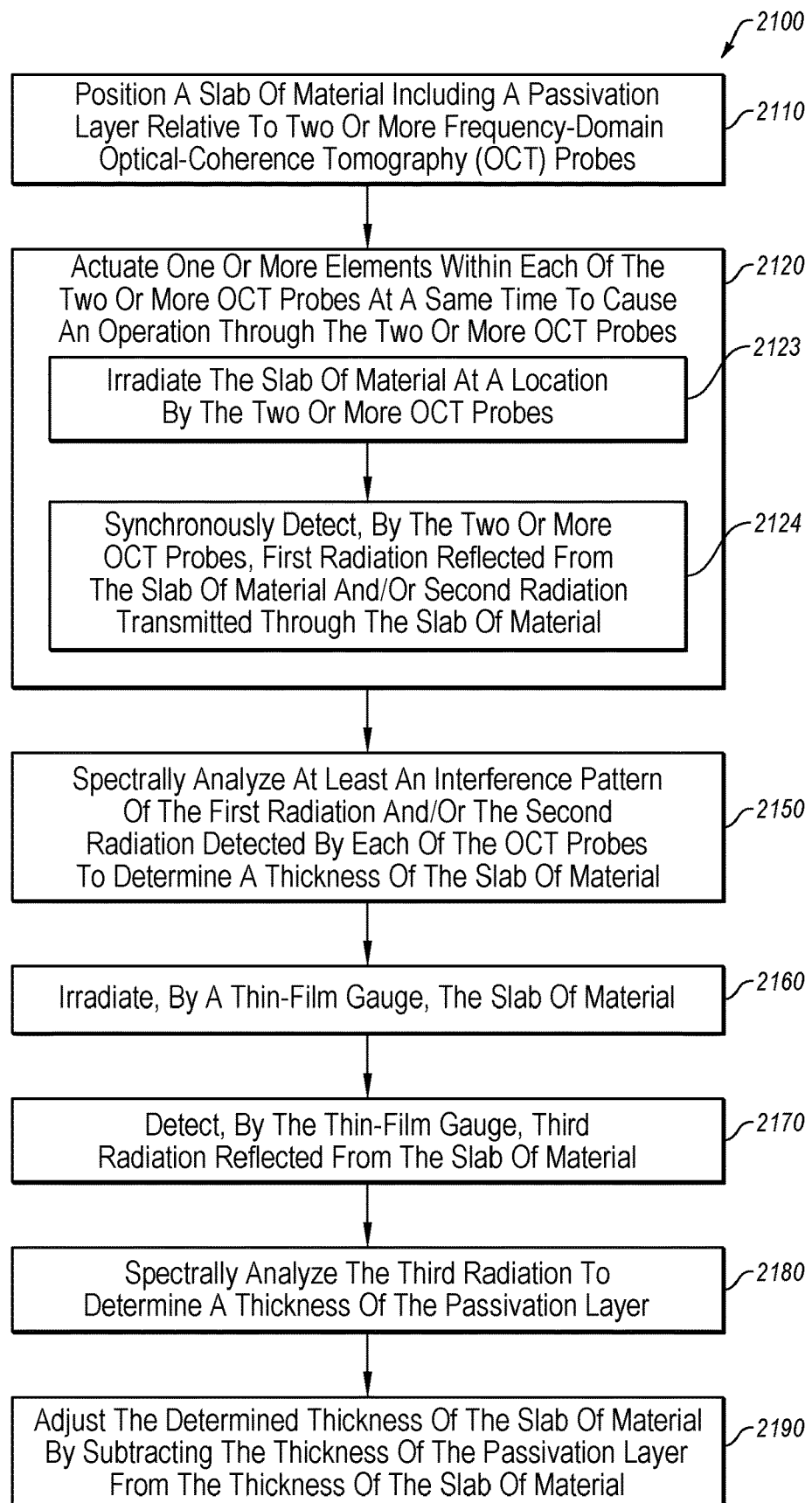
FIG. 21 illustrates a flowchart of another example process of measuring properties of a slab of material that includes multiple layers.

FIG. 21 illustrates a flowchart of another example process 2100 of measuring properties of a slab of material that includes multiple layers, according to at least one embodiment described in this disclosure. In some embodiments, one or more of the operations associated with the method 2100 may be performed by the system 100 of FIG. 1 or the system 1900 of FIG. 19. Blocks of the method 2100 may be performed by any suitable system, apparatus, or device. For example, the computing system 1500 of FIG. 22 may perform one or more of the operations associated with the method 2100. Although illustrated with discrete blocks, the steps and operations associated with one or more of the blocks of the method 2100 may be divided into additional blocks, combined into fewer blocks, or eliminated, depending on the desired implementation.

At block 2110, a slab of material including a passivation layer may be positioned relative two or more frequency-domain optical-coherence tomography (OCT) probes. For example, the slab of material 150 of FIG. 19 may be positioned relative to two or more of the probes 602 of FIG. 19, for example, the probe 602(1) of FIG. 19 and the probe 602(n) of FIG. 19. The slab of material may be positioned a known distance from each of the probes. For example, the back surface of the slab of material 150 may be positioned a known distance from the probe 602(1) and from the probe 602(n).

At block 2120 one or more elements within each of the two or more OCT probes may be actuated at a same time to cause an operation through the two or more OCT probes. The operations may include irradiating the slab of material and detecting radiation from the slab of material. For example, one or more elements within each of the probes 602(1) and 602(n) of FIG. 19 may be actuated at the same time to cause both of the probes 602(1) and 602(n) to irradiate the slab of material 150 of FIG. 19 at a first same time. Further, both of the probes 602(1) and 602(n) may detect radiation at a second same time.

At block 2123 the slab of material may be irradiated at a location by two or more OCT probes. In some embodiments, block 2123 may be part of block 2120 such that the slab of material is irradiated by the two or more OCT probes at the same time.

At block 2124 first radiation reflected from the slab of material and/or second radiation transmitted through the material may be synchronously detected by two or more OCT probes. In some embodiments, block 2124 may be part of block 2120 such that the first radiation and/or the second radiation is detected by the two or more OCT probes at the same time. The first radiation may be reflected from one or more surfaces of the slab of material 150. For example, the slab of material 150 may include multiple layers, including a passivation layer, a metallic layer, and a silicon layer. The first radiation may include radiation reflected from an air-passivation-layer interface. The first radiation may also include radiation reflected from the passivation-layer-metallic-layer interface.

At block 2150 at least an interference pattern of the first radiation and/or the second radiation detected by each of the OCT probes may be spectrally analyzed to determine a thickness of the slab of material. For example an interferometric analysis may be used to determine a travel time for radiation between when it was transmitted at block 2123 and when it was detected at block 2124. The travel time may be converted into a distance between the probe and a surface of the slab of material. After determining a distance between each of the probes, and opposing sides of the slab of material, a thickness of the slab of material may be determined based on the distances between each of the probes and the opposing sides of the slab of material and the distance between the probes.

At block 2160, the slab of material may be irradiated by a thin-film gauge. For example, the thin-film gauge 132 of FIG. 19 may irradiate the slab of material 150 of FIG. 19. The slab of material may be irradiated with visible or ultraviolet light. The wavelength of the radiation used to irradiate the slab of material may be based on a type of material that is assumed to be in the top layer of the slab of material.

At block 2170, third radiation reflected from the slab of material may be detected by the thin-film gauge. For example, the thin-film gauge 132 of FIG. 19 may detect radiation reflected from the slab of material 150 of FIG. 19. The third radiation may be reflected from one or more surfaces of the slab of material. For example, the slab of material may include multiple layers, including a passivation layer, a metallic layer, and a silicon layer. The third radiation may include radiation reflected from an air-passivation-layer interface. The third radiation may also include radiation reflected from the passivation-layer-metallic-layer interface.

At block 2180, the third radiation may be spectrally analyzed to determine a thickness of the passivation layer. For example, the thin-film gauge 132 of FIG. 19 may analyze the radiation detected at block 2170 and determine a thickness of the passivation layer 151 of FIG. 19. For example a spectrometer may be used to determine a change in the third radiation detected at block 2170 from the radiation transmitted at the block 2160. As discussed above, the third radiation may include radiation reflected from more than one layer of the slab of material. Differences in the reflections from the different layers may be used to determine the thickness of one or more of the layers. For example, different wavelengths of radiation may have a peak in energy reflectance.

At block 2190, the determined thickness of the slab of material may be adjusted by subtracting the thickness of the passivation layer from the thickness of the slab of material. For example, the thickness determined at block 2150 may include the passivation layer 151, the metallic layer 152, and the silicon layer 153. At block 2190, the thickness of the passivation layer 151, as determined at block 2180, may be subtracted from the thickness determined at the block 2150 resulting in a determination of the thickness of the metallic layer 152 and the silicon layer 153 without the passivation layer 151.

Modifications, additions, or omissions may be made to the method 2100 without departing from the scope of the present disclosure. For example, in some embodiments, the blocks 2160, 2170, and 2180 may occur before, or at the same time as the blocks 2120 and 2150. Further, the order of operations may vary according to different implementations.

Figure 22:
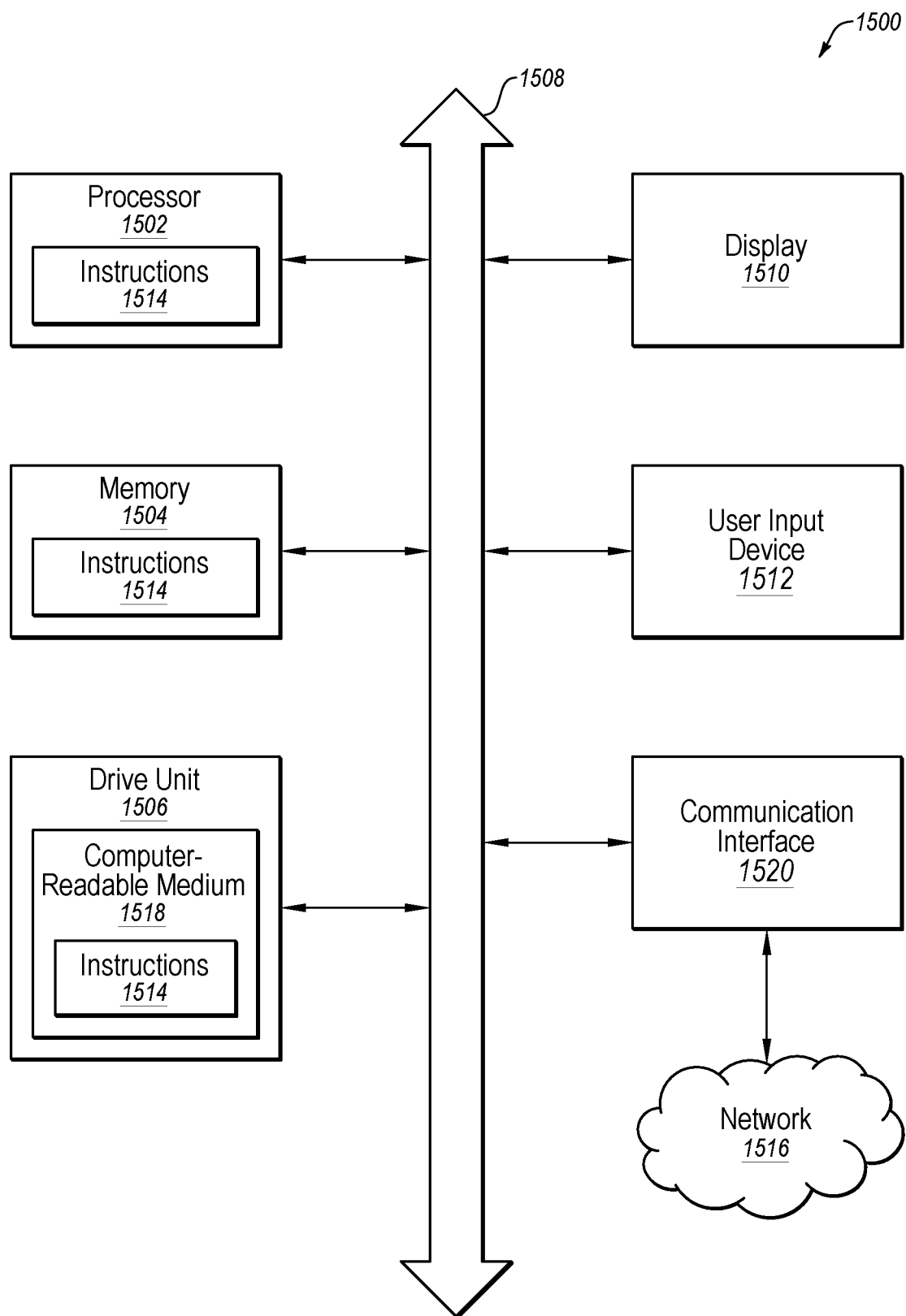
FIG. 22 illustrates a computing device configured to facilitate measurement of properties of a slab of material through synchronized FD-OCT probes.

FIG. 22 illustrates yet another example implementation in accordance with the embodiment of the present disclosure by depicting a computing device configured to facilitate measurement of properties of a slab of material through synchronized FD-OCT probes. More specifically, the present figure illustrates an example hardware configuration of the computer system 124 as a computing system 1500. The computer system 1500 can include a set of instructions that can be executed to cause the computer system 1500 to perform any one or more of the methods disclosed. The computer system 1500 may operate as a standalone device or may be connected, e.g., using a network, to other computer systems or peripheral devices.

In a networked deployment, the computer system 1500 may operate in the capacity of a server or as a client user computer in a server-client user network environment, or as a peer computer system in a peer-to-peer (or distributed) network environment. The computer system 1500 can also be implemented as or incorporated across various devices, such as a personal computer (PC), a tablet PC, a personal digital assistant (PDA), a mobile device, a palmtop computer, a laptop computer, a desktop computer, or any other machine capable of executing a set of instructions (sequential or otherwise) that specify actions to be taken by that machine. In an example implementation, the computer system 1500 may be a mobile computing cum display device capable of being used by a user. Further, while a single computer system 1500 is illustrated, the term "system" shall also be taken to include any collection of systems or sub-systems that individually or jointly execute a set, or multiple-sets, of instructions to perform one or more computer functions.

The computer system 1500 may include a processor 1502 e.g., a central processing unit (CPU), a graphics processing unit (GPU), or both. The processor 1502 may be a component in a variety of systems. For example, the processor 1502 may be part of a standard personal computer or a workstation. The processor 1502 may be one or more general processors, digital signal processors, application specific integrated circuits, field programmable gate arrays, servers, networks, digital circuits, analog circuits, combinations thereof, or other now known or later developed devices for analyzing and processing data The processor 1502 may implement a software program, such as code generated manually (i.e., programmed).

The computer system 1500 may include a memory 1504, such as a memory 1504 that can communicate via a bus 1508. The memory 1504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1504 includes a cache or random access memory for the processor 1502. In alternative examples, the memory 1504 is separate from the processor 1502, such as a cache memory of a processor, the system memory, or other memory. The memory 1504 may be an external storage device or database for storing data. The memory 1504 is operable to store instructions executable by the processor 1502. The functions, acts or tasks illustrated in the figures or described may be performed by the programmed processor 1502 executing the instructions stored in the memory 1504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As illustrated, the computer system 1500 may or may not further include a touch-sensitive display unit 1510, for outputting determined information as well as receiving a user's touch-gesture based inputs, such as drag and drop, single tap, multiple-taps, etc. The display 1510 may act as an interface for the user to see the functioning of the processor 1502, or specifically as an interface with the software stored in the memory 1504 or in the drive unit 1506.

Additionally, the computer system 1500 may include an input device 1512 configured to allow a user to interact with any of the components of system 1500. The computer system 1500 may also include a disk or optical drive unit 1506. The disk drive unit 1506 may include a computer-readable medium 1518 in which one or more sets of instructions 1514, e.g. software, can be embedded. Further, the instructions 1514 may embody one or more of the methods or logic as described. In a particular example, the instructions 1514 may reside completely, or at least partially, within the memory 1504 or within the processor 1502 during execution by the computer system 1500.

The present disclosure contemplates a computer-readable medium that includes instructions 1514 or receives and executes instructions 1514 responsive to a propagated signal so that a device connected to a network 1526 can communicate voice, video, audio, images or any other data over the network 1526. Further, the instructions 1514 may be transmitted or received over the network 1516 via a communication port or interface 1520 or using a bus 1508. The communication port or interface 1520 may be a part of the processor 1502 or may be a separate component. The communication port 1520 may be created in software or may be a physical connection in hardware. The communication port 1520 may be configured to connect with a network 1516, external media, the display 1510, or any other components in computing system 1500, or combinations thereof. The connection with the network 1516 may be established wirelessly as discussed later. Likewise, the additional connections with other components of the system 1500 may be established wirelessly. The network 1516 may alternatively be directly connected to the bus 1508.

The network 1516 may include wireless networks, Ethernet AVB networks, or combinations thereof. The wireless network may be a cellular telephone network, an 802.11, 802.16, 802.20, 802.1Q or WiMax network. Further, the network 1516 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

The present subject matter comprising multiple FD-OCT probes for characterization of one or more properties of a slab of material, at-least enables a substantially high data-acquisition speed through synchronized FD-OCT probes, i.e. through measuring the distances between the probes and slab at the same instant of time. This in turn successfully overcomes the influence of vibration of the slab of material during the process of slab-characterization, which may include the determination of one or more properties of the slab of material as discussed above. Moreover, the present subject matter provides a system low on manufacturing costs through employment of a centralized spectrometer-detector combination.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

I claim:

1. An apparatus for characterization of a slab of material comprising:
two or more frequency-domain optical-coherence tomography (OCT) probes configured to:
irradiate the slab of material at at-least one location; and
detect radiation reflected from the slab of material or transmitted through the slab of material;
a centralized actuation mechanism connected to the two or more OCT probes and configured to actuate one or more elements in each of the OCT probes at a same time during irradiation of the slab of material to cause a synchronized detection of the radiation from the slab of material by the two or more OCT probes; and
a spectral-analysis module configured to analyze an interference pattern of the radiation detected by each of the OCT probes.

2. The apparatus of claim 1, wherein the spectral-analysis module is further configured to analyze the interference pattern of the radiation to determine a thickness of the slab of material.

3. The apparatus of claim 2, wherein the slab of material comprises a first material and a passivation layer on the first material.

4. The apparatus of claim 3, wherein the spectral-analysis module is further configured to analyze the interference pattern of the radiation to determine a thickness of the first material and a thickness of the passivation layer.

5. The apparatus of claim 1, wherein the spectral-analysis module is further configured to analyze the interference pattern of the radiation to determine a topography of the slab of material.

6. The apparatus of claim 5, wherein the slab of material comprises a first material and a passivation layer on the first material.

7. The apparatus of claim 6, wherein the spectral-analysis module is further configured to analyze the interference pattern of the radiation to determine a topography of a first surface of the first material.

8. The apparatus of claim 6, wherein the spectral-analysis module is further configured to analyze the interference pattern of the radiation to determine a topography of a first surface of the passivation layer.

9. A method comprising:
positioning a substantially-flat reference surface on a chuck;
actuating one or more elements within two or more frequency-domain optical-coherence tomography (OCT) probes at the same time to cause an operation through the two or more OCT probes, the operation comprising:
irradiating the substantially-flat reference surface at at-least one location by the two or more OCT probes; and
synchronously detecting, by the two or more OCT probes, radiation reflected from the substantially-flat reference surface or radiation transmitted through the substantially-flat reference material;
spectrally analyzing at least an interference pattern of the radiation detected by each of the OCT probes to determine a topography of the substantially-flat reference surface;
positioning a slab of material on the chuck;
actuating the one or more elements within the two or more OCT probes at the same time to cause an operation through the two or more OCT probes, the operation comprising:
irradiating the slab of material at at-least one location by the two or more OCT probes; and
synchronously detecting, by the two or more OCT probes, radiation reflected from the slab of material or radiation transmitted through the slab of material;

spectrally analyzing at least an interference pattern of the radiation detected by each of the OCT probes to determine a topography of the slab of material; and calibrating the topography of the slab of material by adjusting the topography of the slab of material based on the topography of substantially-flat reference surface.

10. The method of claim 9, wherein the substantially-flat reference surface is a mirror.

11. The method of claim 9, wherein the substantially-flat reference surface is positioned on three or more pins on the chuck and wherein the slab of material is positioned on the three or more pins.

12. A method comprising:

positioning a slab of material on a chuck, the slab of material comprising a first material and a passivation layer;

irradiating the slab of material at at-least one location with a broadband light source;

receiving light reflected by the slab of material at a probe;

spectrally analyzing at least an interference pattern of the received light to determine a thickness of the passivation layer;

actuating one or more elements within two or more frequency-domain optical-coherence tomography (OCT) probes at the same time to cause an operation through the two or more OCT robes, the operation comprising:

irradiating the slab of material at at-least one location by the two or more OCT probes;

synchronously detecting, by the two or more OCT probes, radiation reflected from the slab of material or radiation transmitted through the slab of material; and spectrally analyzing at least an interference pattern of the radiation detected by each of the OCT probes to determine at least one of:

a topography of the slab of material; and a thickness of the slab of material.

* * * * *